United States Patent
Fukatsu et al.

(10) Patent No.: US 11,219,109 B2
(45) Date of Patent: Jan. 4, 2022

(54) VEHICLE FRONT LIGHTING APPARATUS AND DISCONNECTION DETECTION METHOD

(71) Applicant: DENSO CORPORATION, Kariya (JP)

(72) Inventors: Yoichi Fukatsu, Kariya (JP); Toshiya Tanaka, Kariya (JP); Yosuke Ishiguro, Kariya (JP); Hisanori Takenaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 29 days.

(21) Appl. No.: 16/902,634

(22) Filed: Jun. 16, 2020

(65) Prior Publication Data

US 2020/0314984 A1  Oct. 1, 2020

Related U.S. Application Data

(63) Continuation of application No. PCT/JP2018/040933, filed on Nov. 5, 2018.

(30) Foreign Application Priority Data

Dec. 27, 2017 (JP) .............................. JP2017-251844

(51) Int. Cl.
*H05B 45/48* (2020.01)
*B60Q 1/14* (2006.01)
(Continued)

(52) U.S. Cl.
CPC ........... *H05B 45/48* (2020.01); *B60Q 1/1415* (2013.01); *H05B 45/12* (2020.01); *H05B 45/14* (2020.01);
(Continued)

(58) Field of Classification Search
CPC .... B60Q 1/076; B60Q 1/0076; B60Q 1/0094; B60Q 2400/20; B60Q 11/005; H05B 45/48; H05B 45/54; H05B 47/165
See application file for complete search history.

(56) References Cited

U.S. PATENT DOCUMENTS

| 5,621,277 A | * | 4/1997 | Ricca | ....................... B60Q 1/14 |
| | | | | 315/86 |
| 9,769,898 B1 | * | 9/2017 | Buthker | ................. H05B 45/10 |

(Continued)

FOREIGN PATENT DOCUMENTS

| JP | 2008037240 A | 2/2008 |
| JP | 2016088223 A | 5/2016 |

(Continued)

OTHER PUBLICATIONS

U.S. Appl. No. 16/902,596, filed Jun. 16, 2020, Fukatsu et al.
U.S. Appl. No. 16/902,614, filed Jun. 16, 2020, Fukatsu et al.

*Primary Examiner* — Amy Cohen Johnson
*Assistant Examiner* — Syed M Kaiser
(74) *Attorney, Agent, or Firm* — Harness, Dickey & Pierce, P.L.C.

(57) ABSTRACT

A vehicle front lighting apparatus includes a lighting device array in which multiple lighting devices are connected in series, multiple bypass circuits, multiple switch elements, a lighting intensity detector, a lighting schedule generator, a lighting controller, a current value detector, a voltage value controller, a detector, and a disconnection determiner. When there is the switch element to be brought into a closed state during a prohibition period from a lighting timing to a post-lighting timing, the lighting schedule generator changes a timing at which the switch element is brought into the closed state outside the prohibition period. The disconnection determiner determines that a disconnection has occurred (Continued)

in any of the bypass circuits when the number of switch elements detected at the post-lighting timing does not match a voltage value.

12 Claims, 27 Drawing Sheets

(51) Int. Cl.
    *H05B 47/10*     (2020.01)
    *H05B 45/14*     (2020.01)
    *H05B 45/54*     (2020.01)
    *H05B 45/12*     (2020.01)
    *H05B 47/165*     (2020.01)

(52) U.S. Cl.
    CPC ............. *H05B 45/54* (2020.01); *H05B 47/10* (2020.01); *H05B 47/165* (2020.01)

(56) References Cited

U.S. PATENT DOCUMENTS

| | | | | |
|---|---|---|---|---|
| 10,282,227 | B2* | 5/2019 | Lueh | G06F 9/462 |
| 2013/0313973 | A1* | 11/2013 | DeNicholas | H05B 45/48 |
| | | | | 315/122 |
| 2015/0189711 | A1* | 7/2015 | Horsky | H05B 33/10 |
| | | | | 315/186 |
| 2016/0165678 | A1* | 6/2016 | Sudhaus | H05B 45/24 |
| | | | | 315/161 |
| 2018/0063918 | A1* | 3/2018 | Nakamura | B60Q 1/0094 |
| 2018/0209605 | A1* | 7/2018 | Ichikawa | H05B 47/17 |
| 2019/0092221 | A1* | 3/2019 | Kimura | H01L 27/1225 |
| 2019/0098710 | A1* | 3/2019 | Murakami | H05B 45/3725 |
| 2020/0187327 | A1* | 6/2020 | Ichikawa | H05B 45/48 |

FOREIGN PATENT DOCUMENTS

| | | | |
|---|---|---|---|
| JP | 2017152169 A | 8/2017 | |
| WO | WO-2017086220 A1 * | 5/2017 | ............. H05B 47/10 |

* cited by examiner

FIG. 15B

| POST-LIGHTING TIMING | AT12 | AT1 | AT2 | AT3 | AT4 | AT5 | AT6 | AT7 | AT8 | AT9 | AT10 | AT11 | AT12 | AT1 |
|---|---|---|---|---|---|---|---|---|---|---|---|---|---|---|
| THE NUMBER OF LIGHTING LEDS | 8 | 9 | 10 | 10 | 10 | 7 | 4 | 5 | 6 | 6 | 7 | 8 | 8 | 9 |
| THE NUMBER OF ACTUAL LIGHTING LEDS | 8 | 9 | 10 | 11 | 10 | 7 | 4 | 5 | 6 | 7 | 8 | 9 | 8 | 9 |

FIG. 15C

| POST-LIGHTING TIMING | AT12 | AT1 | AT2 | AT3 | AT4 | AT5 | AT6 | AT7 | AT8 | AT9 | AT10 | AT11 | AT12 | AT1 |
|---|---|---|---|---|---|---|---|---|---|---|---|---|---|---|
| THE AMOUNT OF CHANGE IN THE NUMBER OF LIGHTING LEDS | +1 | +1 | +1 | 0 | 0 | -3 | -3 | +1 | +1 | 0 | +1 | +1 | 0 | +1 |
| THE AMOUNT OF CHANGE IN THE NUMBER OF ACTUAL LIGHTING LEDS | +1 | +1 | +1 | +1 | -1 | -3 | -3 | +1 | +1 | +1 | +1 | +1 | -1 | +1 |

VEHICLE FRONT LIGHTING APPARATUS AND DISCONNECTION DETECTION METHOD

CROSS REFERENCE TO RELATED APPLICATIONS

The present application is a continuation application of International Patent Application No. PCT/JP2018/040933 filed on Nov. 5, 2018, which designated the U.S. and claims the benefit of priority from Japanese Patent Application No. 2017-251844 filed on Dec. 27, 2017. The entire disclosures of all of the above applications are incorporated herein by reference.

TECHNICAL FIELD

The present disclosure relates to a vehicle front lighting apparatus and a disconnection detection method.

BACKGROUND

Conventionally, there has been known a vehicle front lighting apparatus that uses multiple lighting devices to illuminate a region in front of a vehicle in a shared manner.

SUMMARY

The present disclosure provides a vehicle front lighting apparatus and a disconnection detection method in which a switch element is not switched from an opened state to a closed state within a prohibition period set before a post-lighting timing for detecting a voltage value and the number of switch elements brought into the opened state.

BRIEF DESCRIPTION OF DRAWINGS

Objects, features and advantages of the present disclosure will become apparent from the following detailed description made with reference to the accompanying drawings. In the drawings:

FIG. 15B is an illustrative diagram of the principle of detecting whether there is a disconnection in a bypass wiring by the vehicle front lighting apparatus according to the second embodiment;

FIG. 15C is an illustrative diagram of the principle of detecting whether there is a disconnection in a bypass wiring by the vehicle front lighting apparatus according to the second embodiment;

DETAILED DESCRIPTION

Figure 1A:
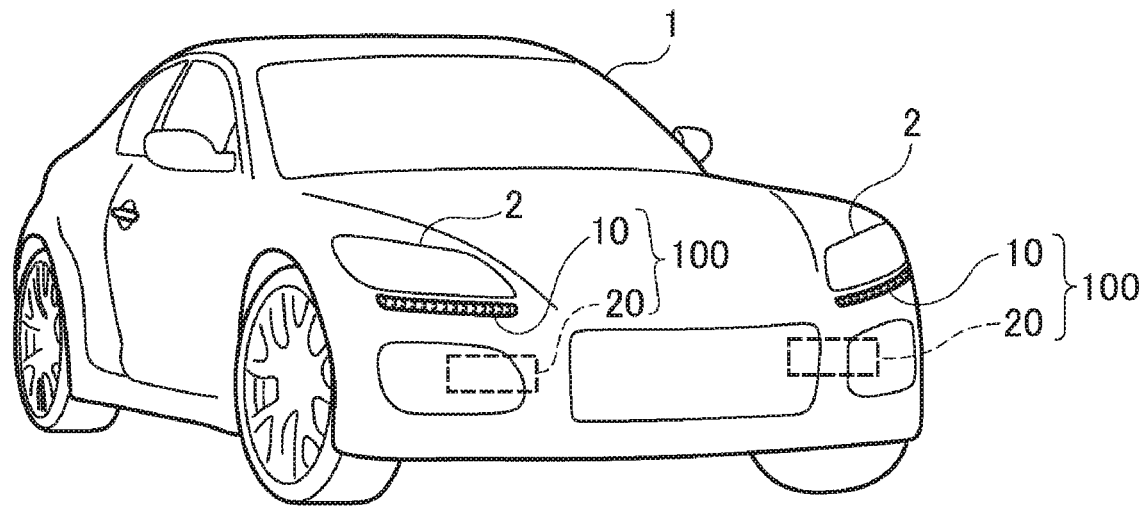
FIG. 1A is a diagram showing a vehicle on which a vehicle front lighting apparatus according to a first embodiment of the present disclosure is mounted.

In a front lighting apparatus mounted on a subject vehicle, it is desired to be able to illuminate a light of high luminance to a long distance and in a wide range in order to enable a driver of the subject vehicle to grasp a situation at the long distance. On the other hand, in order to avoid illuminating a driver of an oncoming vehicle with high luminance to give a dazzle feeling (so-called glare), it is desired to be able to suppress the luminance of the light illuminating the region where the oncoming vehicle is present.

In a certain technique, a vehicle front lighting apparatus includes multiple lighting devices, and each lighting device is used to illuminate a region in front of a vehicle in a shared manner.

In the above technique, when an oncoming vehicle, a pedestrian, or the like are not present, a driver of a subject vehicle can easily grasp a distant situation by irradiating a light of high luminance to a distance and in a wide range. On the other hand, when the oncoming vehicle, the pedestrian, or the like is detected, a situation in which a driver of the oncoming vehicle, the pedestrian, or the like is given the dazzle feeling can be avoided by lowering the luminance of the lighting device in charge of the region where the oncoming vehicle, the pedestrian, or the like is present or turning off the lighting device.

Further, in the technique described above, the number of lighting devices mounted on the vehicle tends to gradually increase. The reason is that, as the number of mounted lighting devices increases, the region in which the lighting is shared by the individual lighting devices becomes smaller, and therefore, a situation can be prevented in which the lighting is darkened to a range in which the oncoming vehicle is not present when, for example, the oncoming vehicle is detected and the luminance of the lighting device is lowered or turned off. Alternatively, as the number of lighting devices increases, the region in front of the vehicle is subdivided into smaller regions, so that the distribution of the brightness illuminating the front can be brought closer to a more appropriate distribution.

However, as the number of lighting devices mounted on the vehicle increases, the number of wirings for driving the lighting devices also increases, thereby making it difficult to detect whether there is a disconnection in a wiring.

A vehicle front lighting apparatus according to a first aspect of the present disclosure is for illuminating a region in front of a vehicle by use of a plurality of lighting devices in a shared manner, and includes: a lighting device array in which a plurality of lighting devices are connected in series; a plurality of bypass circuits respectively provided for the lighting devices and allowing a current flowing through the lighting devices to bypass the lighting devices; a plurality of switch elements respectively provided for the bypass circuits for opening and closing the bypass circuits; a lighting intensity detector; a lighting schedule generator; a lighting controller, a current value detector; a voltage value controller; a detector; and a disconnection determiner. The lighting intensity detector is configured to acquire information on a lighting intensity of each of the lighting devices of the lighting device array. The lighting schedule generator is configured to generate, upon acquiring the information on the lighting intensity, a lighting schedule for turning on the lighting devices at timings different from each other, and turning off the lighting devices at timings respectively corresponding to the lighting intensities of the lighting devices. The lighting controller is configured to repeat, upon receiving the lighting schedule, an operation of bringing the switch element of the lighting device to be turned on into an opened state and bringing the switch element of the lighting device to be turned off into a closed state in a predetermined lighting cycle according to the lighting schedule. The current value detector is configured to detect a current value flowing through the lighting device array. The voltage value controller is configured to apply a voltage to the lighting device array, and to change the voltage value to be applied to cause the current value flowing through the lighting device array reaches a predetermined target current value. The detector is configured to detect the number of switch elements brought into the closed state and the voltage value applied to the lighting device array at a post-lighting timing at which a predetermined change time longer than a time required for the voltage value controller to change the voltage value has elapsed from a lighting timing at which any of the switch elements is brought into the opened state. The disconnection determiner is configured to determine whether the number of switch elements detected at the post-lighting timing matches the voltage value, and to determine that a disconnection has occurred in any of the bypass circuits if not match. When there is the switch element to be brought into the closed state during a prohibition period from the lighting timing to the post-lighting timing, the lighting schedule generator changes a timing at which the switch element is brought into the closed state outside the prohibition period.

A vehicle front lighting apparatus according to a second aspect of the present disclosure is for illuminating a region in front of a vehicle by use of a plurality of lighting devices in a shared manner, and includes: a lighting device array in which the lighting devices are connected in series; a plurality of bypass circuits respectively provided for the lighting devices and allowing a current flowing through the lighting devices to bypass the lighting devices; a plurality of switch elements respectively provided for the bypass circuits for opening and closing the bypass circuits; a lighting intensity detector; a lighting schedule generator, a lighting controller, a current value detector; a voltage value controller; a detector; a change amount detector; and a disconnection determiner. The lighting intensity detector is configured to acquire information on a lighting intensity of each of the lighting devices of the lighting device array. The lighting schedule generator is configured to generate, upon acquiring the information on the lighting intensity, a lighting schedule for turning on the lighting devices at timings different from each other, and turning off the lighting devices at timings respectively corresponding to the lighting intensities of the lighting devices. The lighting controller is configured to repeat, upon receiving the lighting schedule, an operation of bringing the switch element of the lighting device to be turned on into an opened state and bringing the switch element of the lighting device to be turned off into a closed state in a predetermined lighting cycle according to the lighting schedule. The current value detector is configured to detect a current value flowing through the lighting device array. The voltage value controller is configured to apply a voltage to the lighting device array, and to change the voltage value to be applied to cause the current value flowing through the lighting device array reaches a predetermined target current value. The detector is configured to detect the number of switch elements brought into the closed state and the voltage value applied to the lighting device array at a post-lighting timing at which a predetermined change time longer than a time required for the voltage value controller to change the voltage value has elapsed from a lighting timing at which any of the switch elements is brought into the opened state. The change amount detector is configured to acquire, upon detection of the number of switch elements and the voltage value at the post-lighting timing, the amounts of change from the number of switch elements and the voltage value detected at a previous post-lighting timing. The disconnection determiner is configured to determine whether the amount of change in the number of switch elements matches the amount of change in the voltage value, and to determine that a disconnection has occurred in any of the bypass circuits if not match. When there is the switch element to be brought into the closed state during a prohibition period from the lighting timing to the post-lighting timing, the lighting schedule generator changes a timing at which the switch element is brought into the closed state outside the prohibition period.

A vehicle front lighting apparatus according to a third aspect of the present disclosure is for illuminating a region in front of a vehicle by use of a plurality of lighting devices in a shared manner, and includes: a lighting device array in which the lighting devices are connected in series; a plurality of bypass circuits respectively provided for the lighting devices and allowing a current flowing through the lighting devices to bypass the lighting devices; a plurality of switch elements respectively provided for the bypass circuits for opening and closing the bypass circuits; a lighting intensity detector; a lighting schedule generator; a lighting controller; a current value detector; a voltage value controller a first voltage value detector; a second voltage value detector; and a disconnection determiner. The lighting intensity detector is configured to acquire information on a lighting intensity of each of the lighting devices of the lighting device array. The lighting schedule generator is configured to generate, upon acquiring the information on the lighting intensity, a lighting schedule for turning on the lighting devices at timings different from each other, and turning off the lighting devices at timings respectively corresponding to the lighting intensities of the lighting devices. The lighting controller is configured to repeat, upon receiving the lighting schedule, an operation of bringing the switch element of the lighting device to be turned on into an opened state and bringing the switch element of the lighting device to be turned off into a closed state in a predetermined lighting cycle according to the lighting schedule. The current value detector is configured to detect a current value flowing through the lighting device array. The voltage value controller is configured to apply a voltage to the lighting device array, and to control the voltage value to be applied to cause the current value flowing through the lighting device array reaches a predetermined target current value. The first voltage value detector is configured to detect the voltage value applied to the lighting device array at a post-lighting timing at which a predetermined change time longer than a time required for the voltage value controller to change the voltage value has elapsed from a lighting timing at which any of the switch elements is brought into the opened state. The second voltage value detector is configured to detect the voltage value applied to the lighting device array at a pre-lighting timing set to a predetermined margin time before the lighting timing. The disconnection determiner is configured to determine whether the amount of change in the voltage value detected at the pre-lighting timing and the post-lighting timing matches the amount of change caused by incrementing the lighting device to be turned on by one, and to determine that a disconnection has occurred in any of the bypass circuits if not match. When there is the switch element to be brought into the closed state during a prohibition period from a timing that is prior to the pre-lighting timing by the change time to the post-lighting timing, the lighting schedule generator changes a timing at which the switch element is brought into the closed state outside the prohibition period.

A disconnection detection method according to a fourth aspect of the present disclosure is adopted in a vehicle front lighting apparatus that illuminates a region in front of a vehicle by use of a lighting device array in which a plurality of lighting devices are connected in series, for detecting whether a disconnection has occurred in a wiring for driving the lighting devices. The vehicle front lighting apparatus includes: a plurality of bypass circuits respectively provided for the lighting devices and allowing a current flowing through the lighting devices to bypass the lighting devices; a plurality of switch elements respectively provided for the bypass circuits for opening and closing the bypass circuits; and a lighting controller configured to control a lighting mode of the lighting device array by bringing the switch element of the lighting device to be turned on into an opened state and bringing the switch element of the lighting device to be turned off into a closed state. The disconnection detection method includes: acquiring information on a lighting intensity of each of the lighting devices of the lighting device array; generating, upon acquiring the information on the lighting intensity, a lighting schedule for turning on the lighting devices at timings different from each other, and turning off the lighting devices at timings respectively corresponding to the respective lighting intensities of the lighting devices; applying a voltage to the lighting device array, detecting a current value flowing through the lighting device array, and changing a voltage value applied to the lighting device array to cause the current value flowing through the lighting device array to reach a predetermined target current value; detecting the number of switch elements brought into the closed state and the voltage value applied to the lighting device array at a post-lighting timing at which a predetermined change time longer than a time required to change the voltage value applied to the lighting device array has elapsed from a lighting timing at which any of the switch elements is brought into the opened state; and determining whether the number of switch elements detected at the post-lighting timing matches the voltage value, and determining that the disconnection has occurred in any of the plurality of bypass circuits if not match. The generating the lighting schedule includes changing a timing at which the switch element is brought into the closed state outside a prohibition period when there is the switch element to be brought into the closed state during the prohibition period from the lighting timing to the post-lighting timing.

A disconnection detection method according to a fifth aspect of the present disclosure is adopted in a vehicle front lighting apparatus that illuminates a region in front of a vehicle by use of a lighting device array in which a plurality of lighting devices are connected in series, for detecting whether a disconnection has occurred in a wiring for driving the lighting devices. The vehicle front lighting apparatus includes: a plurality of bypass circuits respectively provided for the lighting devices and allowing a current flowing through the lighting devices to bypass the lighting devices; a plurality of switch elements respectively provided for the bypass circuits for opening and closing the bypass circuits; and a lighting controller configured to control a lighting mode of the lighting device array by bringing the switch element of the lighting device to be turned on into an opened state and bringing the switch element of the lighting device to be turned off into a closed state. The disconnection detection method includes: acquiring information on a lighting intensity of each of the lighting devices of the lighting device array; generating, upon acquiring the information on the lighting intensity, a lighting schedule for turning on the lighting devices at timings different from each other, and turning off the lighting devices at timings respectively corresponding to the lighting intensities of the lighting devices; applying a voltage to the lighting device array, detecting a current value flowing through the lighting device array, and changing a voltage value applied to the lighting device array to cause the current value flowing through the lighting device array to reach a predetermined target current value; detecting the number of switch elements brought into the closed state and the voltage value applied to the lighting device array at a post-lighting timing at which a predetermined change time longer than a time required to change the voltage value applied to the lighting device array has elapsed from a lighting timing at which any of the switch elements is brought into the opened state; upon detection of the number of switch elements and the voltage value at the post-lighting timing, acquiring the amounts of change from the number of switch elements and the voltage value detected at a previous post-lighting timing; and determining whether the amount of change in the number of switch elements matches the amount of change in the voltage value, and determining that the disconnection has occurred in any of the bypass circuits if not match. The generating the lighting schedule includes changing a timing at which the switch element is brought into the closed state outside a prohibition period when there is the switch element to be brought into the closed state during the prohibition period from the lighting timing to the post-lighting timing.

A disconnection detection method according to a sixth aspect of the present disclosure is adopted in a vehicle front lighting apparatus that illuminates a region in front of a vehicle by use of a lighting device array in which a plurality of lighting devices are connected in series, for detecting whether a disconnection has occurred in a wiring for driving the lighting devices. The vehicle front lighting apparatus includes: a plurality of bypass circuits respectively provided for the lighting devices and allowing a current flowing through the lighting devices to bypass the lighting devices; a plurality of switch elements respectively provided for the bypass circuits for opening and closing the bypass circuits; and a lighting controller configured to control a lighting mode of the lighting device array by bringing the switch element of the lighting device to be turned on into an opened state and bringing the switch element of the lighting device to be turned off into a closed state. The disconnection detection method includes: acquiring information on a lighting intensity of each of the lighting devices of the lighting device array; generating, upon acquiring the information on the lighting intensity, a lighting schedule for turning on the lighting devices at timings different from each other, and turning off the lighting devices at timings respectively corresponding to the lighting intensities of the lighting devices; applying a voltage to the lighting device array, detecting a current value flowing through the lighting device array, and changing a voltage value applied to the lighting device array to cause the current value flowing through the lighting device array to reach a predetermined target current value; detecting the voltage value applied to the lighting device array at a pre-lighting timing set to a predetermined margin time before a lighting timing at which any of the switch elements is brought into the opened state; detecting the voltage value applied to the lighting device array at a post-lighting timing at which a predetermined change time longer than a time required to change the voltage value applied to the lighting device array has elapsed from the lighting timing; and determining whether the amount of change in the voltage value detected at the pre-lighting timing and the post-lighting timing matches the amount of change caused by incrementing the lighting device by one, and determining that the disconnection has occurred in any of the bypass circuits if not match. The generating the lighting schedule includes changing a timing at which the switch element is brought into the closed state outside a prohibition period when there is the switch element to be brought into the closed state during the prohibition period from a timing that is prior to the pre-lighting timing by the change time to the post-lighting timing.

A timing at which the switch element is switched from the opened state to the closed state varies with the lighting intensity for each lighting device. Further, when the switch element is switched from the opened state to the closed state, the lighting device which has been turned on is turned off, so that the voltage value applied to the lighting device array is reduced, but it takes a certain amount of time to reach the reduced voltage value. Therefore, depending on a temporal positional relationship between the timing at which the switch element is switched from the opened state to the closed state and the timing at which the number of switch elements brought into the opened state is detected, an erroneous voltage value in the course of change may be detected, and whether there is a disconnection may be erroneously detected.

On the other hand, in any of the vehicle front lighting apparatus and the disconnection detection method according to the first to sixth aspects of the present disclosure described above, the switch element is not switched from the opened state to the closed state within the prohibition period set before the post-lighting timing for detecting the voltage value and the number of switch elements brought into the opened state. For that reason, a situation can be avoided in which the erroneous voltage value is detected to erroneously detect whether there is a disconnection.

First Embodiment

A vehicle front lighting device 100 according to a first embodiment of the present disclosure will be described with reference to the drawings. FIG. 1A shows a vehicle 1 on which a vehicle front lighting apparatus (FL) 100 according to the first embodiment is mounted. As shown in FIG. 1A, one front lighting apparatus 100 is mounted on each of the left and right sides of the vehicle 1, and each vehicle front lighting apparatus 100 includes an LED array 10 in which multiple light emitting diodes (hereinafter, referred to as LEDs) are disposed in a row, and a control module 20 for controlling lighting operation of individual LEDs forming the LED array 10. The LED arrays 10 are mounted one by one under headlights 2 mounted on the front left and right of the vehicle 1, and the control modules 20 are mounted inside the vehicle 1 inside the LED arrays 10.

Figure 1B:
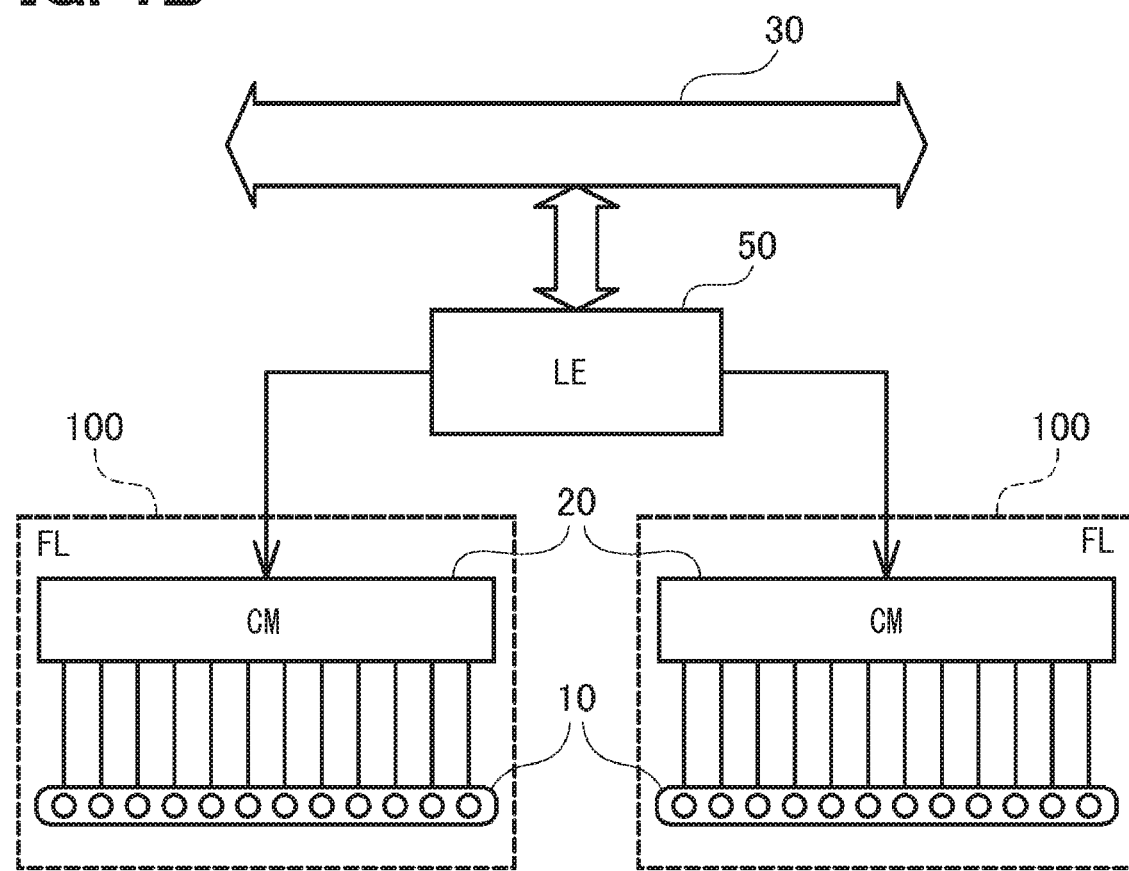
FIG. 1B is an illustrative diagram showing the vehicle front lighting apparatus according to the first embodiment mounted on the vehicle.

Further, as shown in FIG. 1B, the control modules (CM) 20 are each connected to a lamp ECU (LE) 50 mounted on the vehicle 1, and controls the operation of lighting the individual LEDs forming each LED array 10 in accordance with an instruction from the lamp ECU 50. The lamp ECU 50 is connected to an in-vehicle LAN 3 that connects multiple control ECUs (not shown) mounted on the vehicle 1, and determines an instruction content to be output to the lamp ECU 50 based on information received from other control ECUs through the in-vehicle LAN 3.

Figure 2:
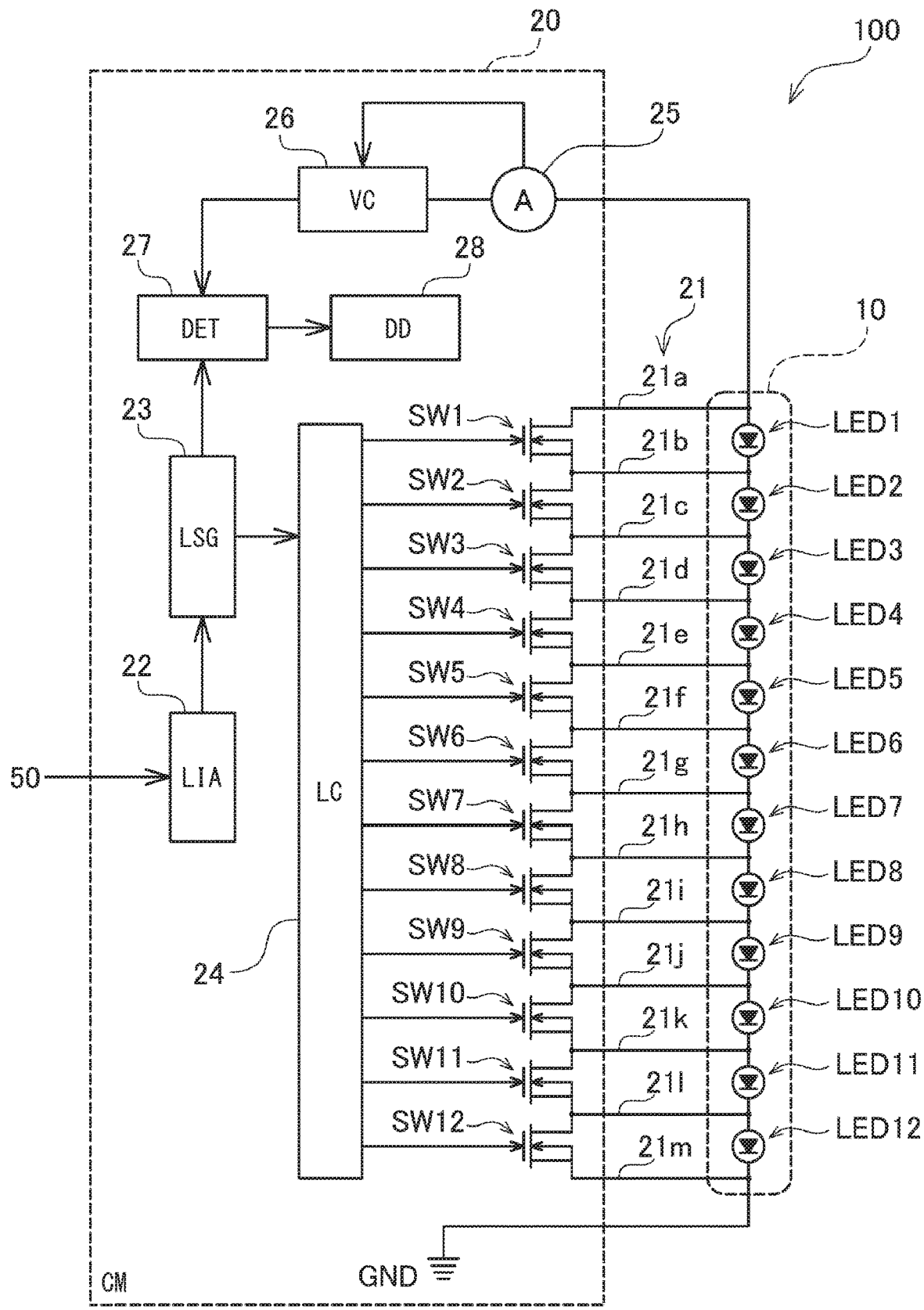
FIG. 2 is a block diagram showing an internal structure of the vehicle front lighting apparatus according to the first embodiment.

FIG. 2 shows a rough internal structure of the vehicle front lighting apparatus 100 according to the first embodiment. As shown in FIG. 1, the vehicle front lighting apparatus 100 according to the first embodiment includes an LED array 10 and a control module 20. The LED arrays 10 are each structured such that LED 1 to LED 12 is connected in series to each other, and a cathode side of the LED 12 is grounded to a ground GND. In the first embodiment, the LED 1 to the LED 12 correspond to "lighting devices" in the present disclosure, and the LED array 10 corresponds to an "lighting device array" in the present disclosure.

The control modules 20 each include the same number of switch elements SW1 to SW12 as that of the LED 1 to the LED 12 in the LED arrays 10, and the switch elements SW1 to SW12 are connected in series with each other. A bypass wiring 21a drawn from an anode side (that is, a side not connected to the LED 2) of the LED 1 is connected to an upstream side (that is, a side not connected to the switch element SW2) of the switch element SW1. A bypass wiring 21b drawn from between the LED 1 and the LED 2 is connected between the switch element SW1 and the switch element SW2. Further, a bypass wiring 21c drawn from between the LED 2 and the LED 3 is connected between the switch element SW2 and the switch element SW3. Hereinafter, in the same manner, bypass wirings 21d to 21l led out from between the LED 3 to the LED 12 are connected between the switch element SW3 and the switch element SW12. A bypass wiring 21m drawn from a cathode side (that is, a side grounded to the ground GND) of the LED 12 is connected to a downstream side (that is, a side not connected to the switch element SW11) of the switch element SW12.

For that reason, when the switch element SW1 is rendered conductive, the bypass wiring 21a and the bypass wiring 21b are rendered conductive through the switch element SW1, as a result of which a bypass circuit 21 that bypasses the LED 1 is formed. In addition, when the switch element SW2 is rendered conductive, the bypass wiring 21b and the bypass wiring 21c are rendered conductive through the switch element SW2, as a result of which the bypass circuit 21 that bypasses the LED 2 is formed. Similarly, the switch elements SW3 to SW12 are rendered conductive to form the bypass circuits 21 for bypassing the LED 3 to the LED 12, respectively.

A switch element called a power transistor is used as each of the switch elements SW1 to SW12. The power transistor has three terminals, and when a control terminal among those terminals is set to a high state, the other two terminals are rendered conductive, and when the control terminal is set to a low state, the other two terminals are rendered non-conductive.

When there is no particular need to distinguish the switch elements SW1 to SW12 from each other, the switch element SW may be simply referred to as the switch element SW, and when there is no particular need to distinguish the LED 1 to the LED 12 from each other, the switch element SW may be simply referred to as the LED.

Further, that the switch element SW is rendered conductive may be represented by that the switch element SW is brought into a closed state, and that the switch element SW is rendered non-conductive may be represented by that the switch element SW is brought into an opened state.

In addition to the switch elements SW1 to SW12, the control module 20 includes a lighting intensity acquisition unit (LIA) 22, a lighting schedule generation unit (LSG) 23, a lighting control unit (LC) 24, a current value detection unit 25, a voltage value control unit (VC) 26, a detection unit (DET) 27, and a disconnection determination unit (DD) 28. The lighting intensity acquisition unit 22 corresponds to a "lighting intensity detector" in the present disclosure, the lighting schedule generation unit 23 corresponds to a "lighting schedule generator" in the present disclosure, the lighting control unit 24 corresponds to a "lighting controller" in the present disclosure, the current value detection unit 25 corresponds to a "current value detector" in the present disclosure, the voltage value control unit 26 corresponds to a "voltage value controller" in the present disclosure, the detection unit 27 corresponds to a "detector" in the present disclosure, the disconnection determination unit 28 corresponds to a "disconnection determiner" in the present disclosure.

Note that those "units" are abstract concepts in which the inside of the control module 20 is classified for convenience, focusing on the functions of the control module 20 of the vehicle front lighting apparatus 100 in order for the control module 20 to light the LED 1 to the LED 12 and detect the presence or absence of disconnection in the bypass wirings 21a to 21m. Therefore, it is not meant that the control module 20 of the vehicle front lighting apparatus 100 is physically divided into those "units". Those "units" can be realized as a computer program executed by a CPU, can be realized as an electronic circuit including an LSI and a memory, or can be realized by combining the computer program with the electronic circuit.

The lighting intensity acquisition unit 22 acquires, from the lamp ECU 50, information on the intensity with which the front is illuminated (hereinafter, referred to as lighting intensity) for each of the LED 1 to the LED 12 of the LED array 10 (hereinafter, referred to as "lighting intensity").

The lighting schedule generation unit 23 receives the lighting intensity from the lighting intensity acquisition unit 22, and generates a lighting schedule for turning on the LED 1 to the LED 12 of the LED array 10 at a different timing from each other, and turning off the LED 1 to the LED 12 at timings corresponding to the lighting intensities of the LED 1 to the LED 12.

The lighting control unit 24 is connected to control terminals of the switch elements SW1 to SW12, and the control terminals of the respective switch elements SW1 to SW12 can be individually set to a high state or a low state. The lighting control unit 24 switches the control terminals of the switch elements SW1 to SW12 to the high state or the low state in accordance with the lighting schedule generated by the lighting schedule generation unit 23.

The current value detection unit 25 is connected in series with the LED array 10, and can detect a value of current flowing through the LED array 10. Since the LED 1 to the LED 12 are connected in series with each other inside the LED array 10, the current value detected by the current value detection unit 25 is a value of current flowing through each of the LED 1 to the LED 12.

The voltage value control unit 26 applies a voltage to the LED array 10, receives a value of current flowing through the LED array 10 from the current value detection unit 25, and controls a voltage value to be applied to the LED array 10 so that the current value becomes a predetermined target current value.

The detection unit 27 detects the number of switch elements SW whose control terminals are in the low state and the voltage values applied to the LED arrays 10 at a timing when a predetermined change time has elapsed from a timing when any of the control terminals of the switch elements SW1 to SW12 is in the low state. In this example, the change time is set to the following time. In other words, when any of the control terminals of the switch elements SW1 to SW12 is set to the low state, the number of LEDs to be lit increases, as a result of which the voltage value control unit 26 increases the voltage value to be applied to the LED arrays 10, but it takes some time for the voltage value control unit 26 to change the voltage value. The change time is set to be longer than the time required for the voltage value control unit 26 to change the voltage value.

The number of switch elements SW can be acquired from the lighting schedule generation unit 23 (or the lighting control unit 24), and the voltage value can be acquired from the voltage value control unit 26.

When any of the control terminals of the switch elements SW1 to SW12 is in the low state, the corresponding LED is lit, and therefore the timing at which any of the control terminals of the switch elements SW1 to SW12 is in the low state is hereinafter referred to as a "lighting timing". Further, the timing at which the change time has elapsed from the lighting timing is hereinafter referred to as a "post-lighting timing".

When there is a switch element whose control terminal is in the high state during the prohibition period from the lighting timing at which the control terminal of any switch element SW is in the low state to the post-lighting timing, the lighting schedule generation unit 23 changes the timing at which the control terminal of the switch element is in the high state to the timing outside of the prohibition period.

The disconnection determination unit 28 receives the number of switch elements SW and the voltage value from the detection unit 27, and determines whether both of the number of switch elements SW and the voltage value match each other, thereby detecting whether there is a disconnection in the bypass wirings 21a to 21m.

In the vehicle front lighting apparatus 100 according to the first embodiment, the presence or absence of a disconnection in the bypass wirings 21a to 21m can be easily and accurately detected. Hereinafter, the reason why the above detection can be performed will be described, and the operation of the vehicle front lighting apparatus 100 to turn on the LED 1 to the LED 12 will be described as a preparatory measure.

Figure 3A:
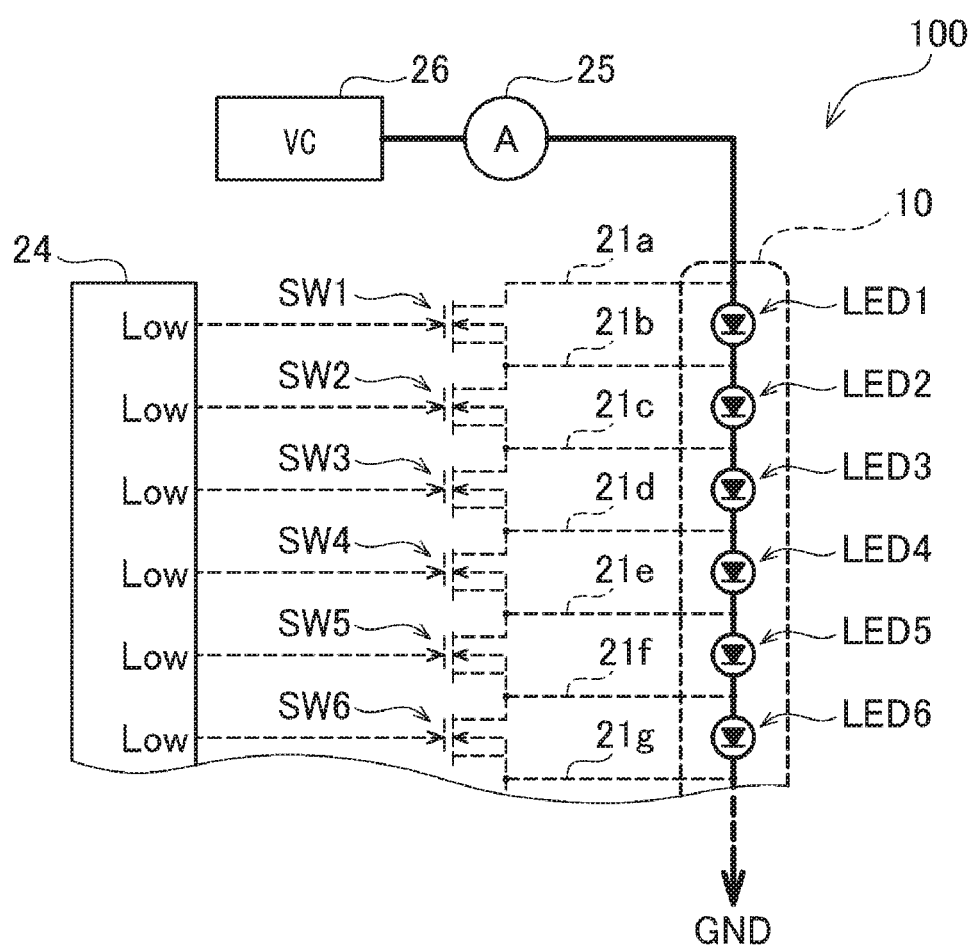
FIG. 3A is an illustrative diagram of an operation of the vehicle front lighting apparatus for lighting multiple LEDs of an LED array at a time according to the first embodiment.
Figure 3B:
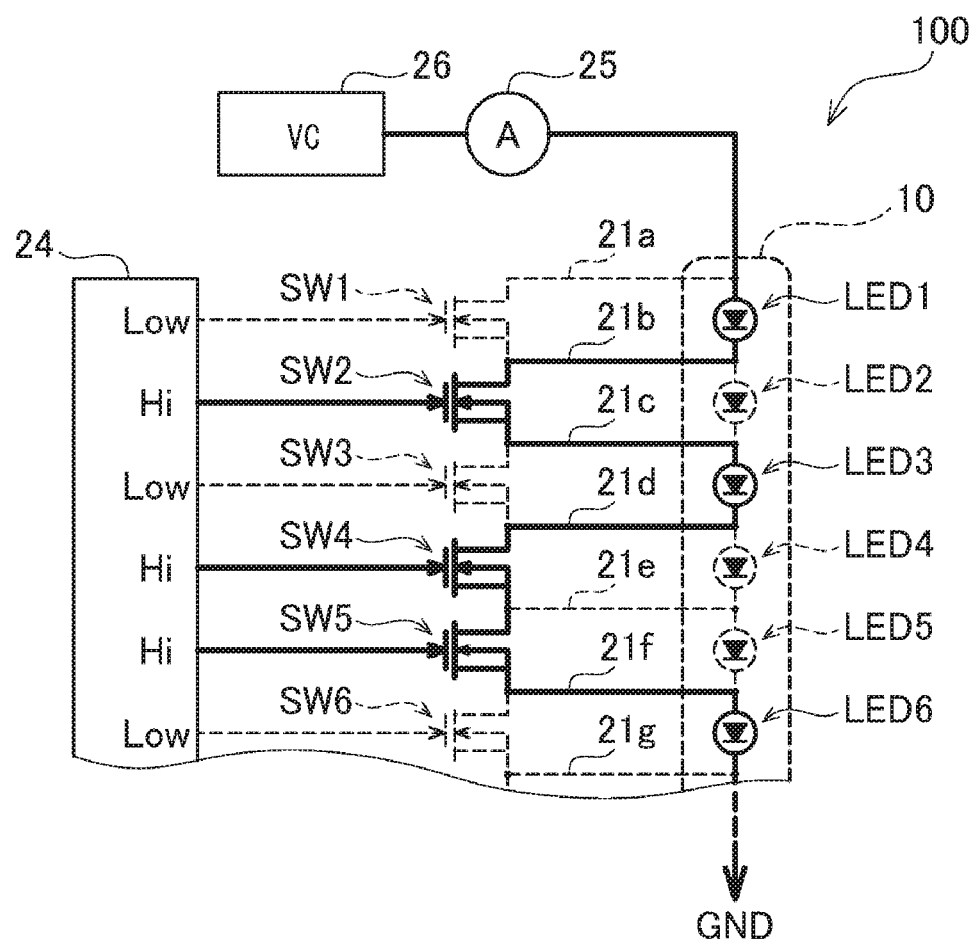
FIG. 3B is an illustrative diagram of an operation of the vehicle front lighting apparatus for lighting multiple LEDs of an LED array individually according to the first embodiment.

FIGS. 3A and 3B show the operation of the vehicle front lighting apparatus 100 according to the first embodiment to turn on or off the LED 1 to the LED 12. In the LED array 10, twelve LEDs of the LED 1 to LD 12 are connected in series to each other (see FIG. 2); however, in order to avoid complication of the illustration, the LED 7 to the LED 12 are omitted in FIGS. 3A and 3B. Therefore, in the descriptions in FIGS. 3A and 3B, it is assumed that the LED array 10 includes six LEDs of the LED 1 to the LED 6 connected in series, and the switch elements are also provided with the six switch elements SW1 to SW6.

As shown in FIG. 3A, when the respective control terminals of the switch elements SW1 to SW6 are set to the low state (Low), the switch elements SW1 to SW6 are brought into the disconnection state (that is, the opened state). For that reason, when a voltage is applied from the voltage value control unit 26 to the LED array 10, a current flows through the LED array 10 as indicated by a thick solid line in the drawing and the LED 1 to the LED 6 are turned on.

Next, as shown in FIG. 3B, the control terminal of the switch element SW2 is set to the high state (Hi). Then, the switch element SW2 is rendered conductive (that is, closed state), and the bypass circuit 21 (that is, the bypass wiring 21b, the switch element SW2, and the bypass wiring 21c) which bypasses the LED 2 is rendered conductive. Since a resistance value of the LEDs is generally larger than a resistance value of the bypass circuit 21, a current flowing through the LED 2 flows through the bypass circuit 21 through the switch element SW2, as a result of which the LED 2 is turned off.

When the control terminals of the switch element SW4 and the switch element SW5 are set to the high state, the switch element SW4 and the switch element SW5 are brought into the closed state. As a result, the current flowing through the LED 4 and the LED 5 flows through the bypass circuit 21 (that is, the bypass wiring 21d, the switch element SW4, the switch element SW5, and the bypass wiring 21f) through the switch element SW4 and the switch element SW5, and the LED 4 and the LED 5 are turned off.

In FIG. 3B, a thick solid line represents a path through which a current flows when the control terminals of the switch element SW2, the switch element SW4, and the switch element SW5 are set to the high state. Therefore, in an example shown in FIG. 3B, the light is irradiated from the LED 1, LED 3, and LED 6.

As is clear from FIGS. 3A and 3B, when the lighting control unit 24 sets a control terminal of a certain switch element to the low state, the LED corresponding to the switch element SW is turned on, and conversely, when the control terminal is set to the high state, the LED corresponding to the switch element SW is turned off. Regardless of which LED is turned on, a current value of the current flowing through each LED is a current value detected by the current value detection unit 25.

In an example shown in FIG. 3A, a current flows through six LEDs, but in an example shown in FIG. 3B, a current flows through three LEDs and three switch elements. In this example, since the resistance value of the switch elements is sufficiently smaller than the resistance value of the LEDs, the resistance value of a path through which the current flows is halved by switching from the state of FIG. 3A to the state of FIG. 3B. Therefore, if the voltage value applied by the voltage value control unit 26 is not changed, the value of the current flowing through each LED is doubled. Conversely, in order to maintain the value of the current flowing through each LED, there is a need to halve the value of the voltage to be applied by the voltage value control unit 26.

Therefore, the voltage value control unit 26 detects the current value of the LED by the current value detection unit 25, and controls the voltage value to be applied so that the current value becomes a predetermined target current value.

In addition, since the current value of the LED is controlled to be a constant target current value in this manner, the intensity with which the lighting LED illuminates the front (that is, the lighting intensity) is the same. Therefore, in order to change the lighting intensity of each LED, the following method is employed.

Figure 4:
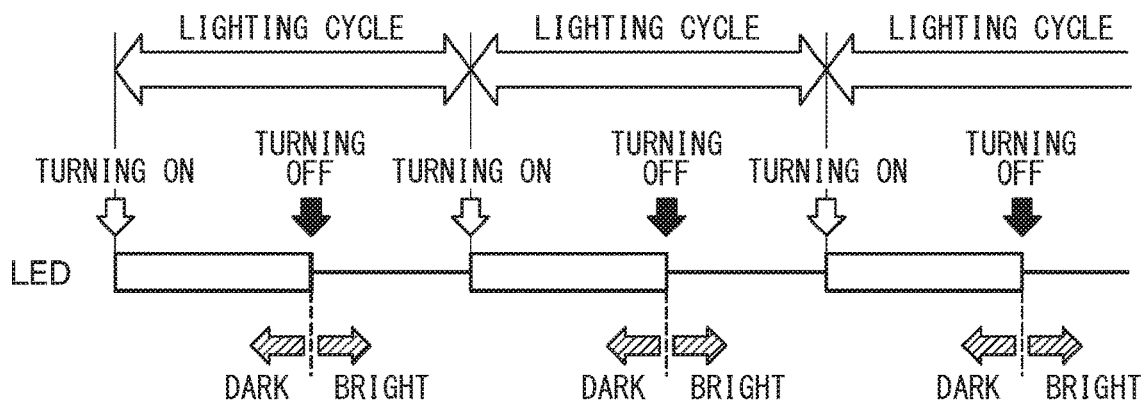
FIG. 4 is an illustrative view showing a method of changing a lighting intensity of the LEDs by the vehicle front lighting apparatus according to the first embodiment.

FIG. 4 shows how the lighting intensity of the LED is changed. As shown in the figure, the LEDs repeatedly turn on and off within a predetermined lighting cycle. In this example, if the lighting cycle is set to a short period of time that is not recognizable by a human being, the lighting intensity of the LED can be reduced by reducing a ratio of the period of time during which the LED is lit in the lighting cycle, and the lighting intensity of the LED can be increased by increasing the ratio of the period of time during which the LED is lit.

Therefore, in the vehicle front lighting apparatus 100 according to the first embodiment, the lighting intensity of the LED is changed by changing the timing at which the LED is turned off after the LED is periodically turned on in a predetermined lighting cycle. Incidentally, a state in which the lighting time is "0" in the lighting cycle is turned off, and the lighting state is a state of maximum lighting intensity during the lighting cycle. In the vehicle front lighting apparatus 100 according to the first embodiment, the lighting cycle is set to a time of about 3 msec.

As described above with reference to FIG. 2, the 12 LEDS of the LED 1 to the LED 12 are provided in the LED array 10. In any of the LED 1 to the LED 12, as shown in FIG. 4, the luminance of the LED is adjusted by changing the turning-off timing after the LED is periodically turned on in a predetermined lighting cycle. However, the lighting cycles of the LED 1 to the LED 12 are set to be out of phase with each other, as a result of which the timings at which the LED 1 to the LED 12 are turned on are also different from each other.

Figure 5:
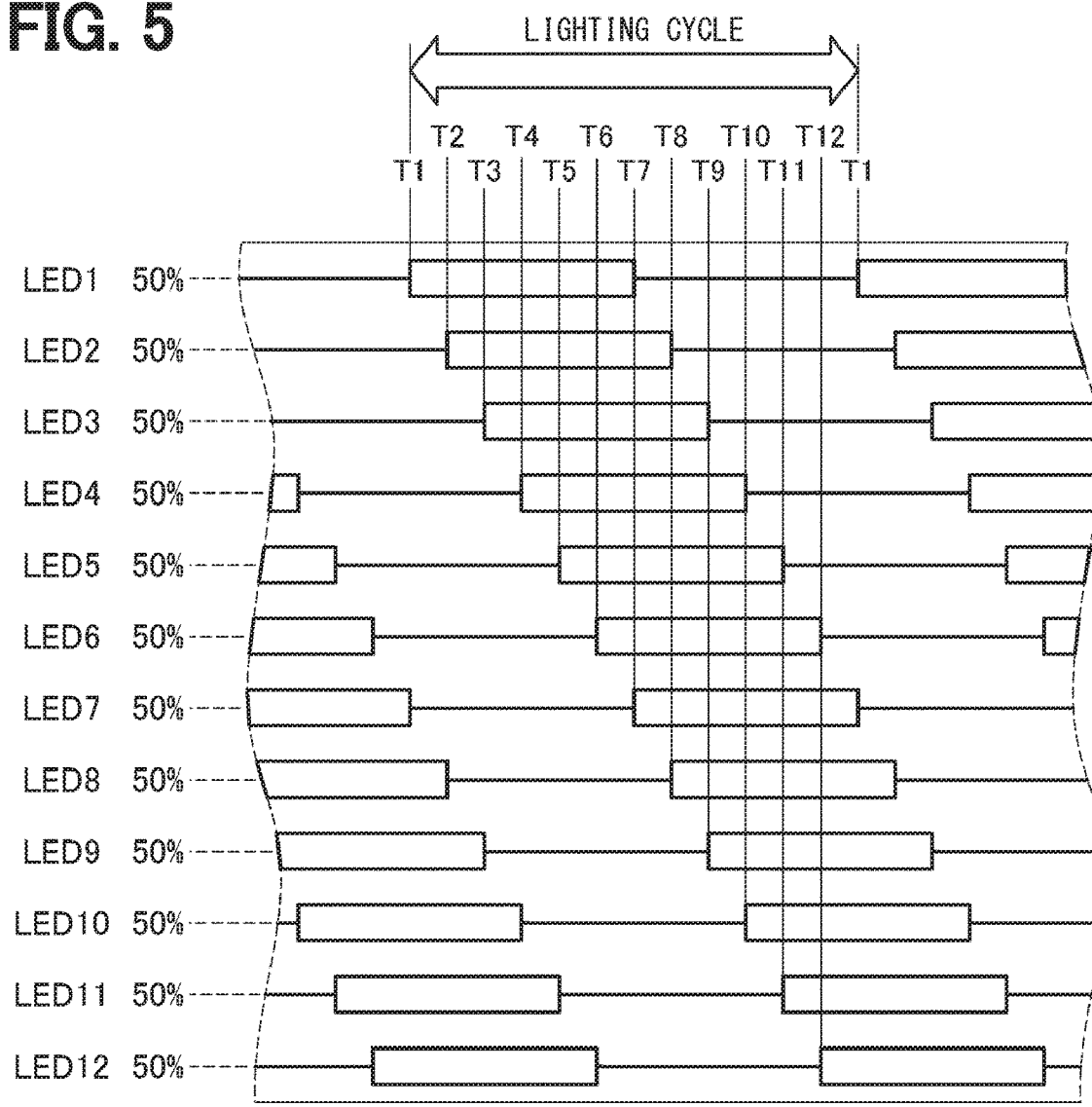
FIG. 5 is an illustrative diagram illustrating a state in which the vehicle front lighting apparatus of the first embodiment illuminates the front of the vehicle by lighting a plurality of LEDs of the LED array with the same lighting intensity.

FIG. 5 illustrates a state in which the LED 1 to the LED 12 are turned on at different timings from each other. Incidentally, in an example shown in FIG. 5, a lighting duty ratio is set to 50% for each of the LED 1 to the LED 12. Here, the lighting duty ratio represents a ratio of a time during which the LED is turned on to the lighting cycle.

As shown in the figure, the LED 1 is turned on at a timing T1, the LED 2 is turned on at a timing T2, and the LED 3 is turned on at a timing T3. In the same manner, the LED 4 to the LED 12 are turned on sequentially at timings T4 to T12. The LED 1 to the LED 12 turned on in order in this manner are turned off in order at a time when a predetermined time has elapsed since the lighting (in this example, a half of the lighting cycle since the lighting duty ratio is set to 50%). Then, after the lapse of the lighting cycle after the LED 1 is turned on, the LED 1 is turned on again, and then the LED 2 to the LED 12 are turned on in order.

If the LED 1 to the LED 12 are turned on at a time, the resistance value of a path through which the voltage value control unit 26 causes a current to flow becomes the resistance value of 12 LEDs, and therefore, the voltage value control unit 26 needs to apply a large voltage (see FIG. 3A). Further, when the LED 1 to the LED 12 are turned on at a time, the LED 1 to the LED 12 are turned off at the same time after a period of time corresponding to the lighting duty ratio has elapsed. For that reason, since the resistance value of the path through which the current flows rapidly decreases to the resistance value of the 12 switch elements, there is a need to rapidly decrease the voltage value applied by the voltage value control unit 26. Thereafter, when the LED 1 to the LED 12 are turned on, large voltages need to be applied. As described above, when the LED 1 to the LED 12 are turned on at a time, the voltage value control unit 26 necessaries to greatly vary the voltage value to be applied.

On the other hand, as illustrated in FIG. 5, when the phases of the lighting cycle of the LED 1 to the LED 12 are shifted from each other, the LED 1 to the LED 12 are turned on in order and then turned off in order, so that the variation of the voltage value applied by the voltage value control unit 26 can be reduced. In particular, in an example shown in FIG. 5, the lighting duty ratio of the LED 1 to the LED 12 is set to 50%, and thus the number of LEDs that are lighting is six at any time. For that reason, the voltage value control unit 26 does not need to change the voltage value.

However, the lighting intensity at which the LED 1 to the LED 12 are turned on changes in accordance with information such as the surrounding state of the vehicle 1, the presence or absence of an oncoming vehicle, a pedestrian, or the like, and information such as the position at which the oncoming vehicle or pedestrian is detected. As described above with reference to FIG. 1B, when the lamp ECU 50 mounted on the vehicle 1 acquires those pieces of information through the in-vehicle LAN 3, the lamp ECU 50 determines the distribution of the lighting intensity for lighting the LED 1 to the LED 12 (so-called light distribution pattern), and outputs the distribution to the vehicle front lighting apparatus 100. Then, the control module 20 of the vehicle front lighting apparatus 100 determines the timings at which the LED 1 to the LED 12 are turned on and off in accordance with the light distribution pattern.

Figure 6A:
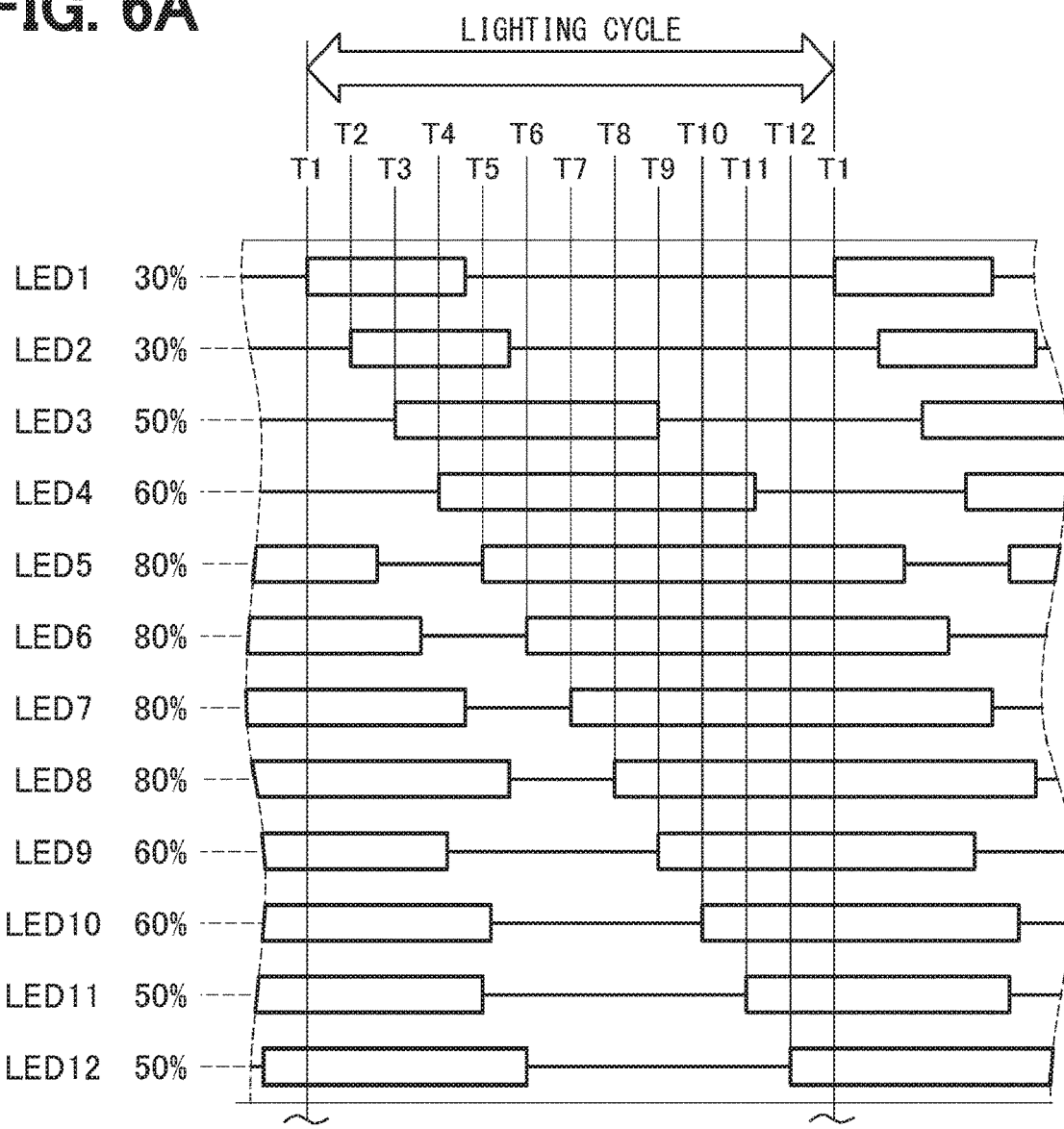
FIG. 6A is a diagram showing timings at which a plurality of LEDs determined according to light distribution patterns are turned on and off by the vehicle front lighting apparatus of the first embodiment.

In FIG. 6A, timings at which the LED 1 to the LED 12 determined according to the light distribution pattern are turned on and off are illustrated. In an example shown in the figure, in a light distribution pattern, the lighting duty ratio of the LED 1 and LED 2 is 30%, the lighting duty ratio of the LED 3 is 50%, the lighting duty ratio of the LED 4 is 60%, the lighting duty ratio of the LED 5 to the LED 8 is 80%, the lighting duty ratio of the LED 9 and the LED 10 is 60%, and the lighting duty ratio of the LED 11 to the LED 12 is 50%.

As described above with reference to FIG. 5, the LED 1 to the LED 12 are turned on sequentially at timings T1 to T12. Since the lighting duty ratio of the LED 1 is 30%, the LED 1 is turned off at a timing when a time corresponding to 30% of the lighting cycle elapses after the LED 1 has been turned on at the timing T1. Since the lighting duty ratio of the LED 2 is 30%, the LED 2 is turned off at a timing when a time corresponding to 30% of the lighting cycle has elapsed after the LED 2 has been turned on at the timing T2. Further, since the lighting duty ratio of the LED 3 is 50%, the LED 3 is turned off at a timing when a time corresponding to 50% of the lighting cycle has elapsed after the LED 3 has been turned on at the timing T3. Hereinafter, in the same manner, the LED 4 to the LED 12 are turned off at a timing when a time corresponding to each lighting duty ratio has elapsed after the LED 4 to the LED 12 have been turned on in order at the timing of T4 to T12. In this manner, the timing at which the LED 1 to the LED 12 are turned on and off can be determined in accordance with the light distribution pattern.

In the present specification, timings at which to turn on and off the LED 1 to the LED 12 determined according to the light distribution pattern are referred to as "lighting schedule". Further, in the first embodiment, since the timing at which the LED 1 to the LED 12 are turned on is determined in advance, actually, the turn-off timing is determined exclusively. However, the timing at which the LED 1 to the LED 12 are turned on may also be changed as required.

After the lighting schedule of the LED 1 to the LED 12 has been determined as described above, the LED 1 to the LED 12 are turned on or off by setting the control terminals of the switch elements SW1 to SW12 to the low state or the high state in accordance with the lighting schedule.

Figure 6B:
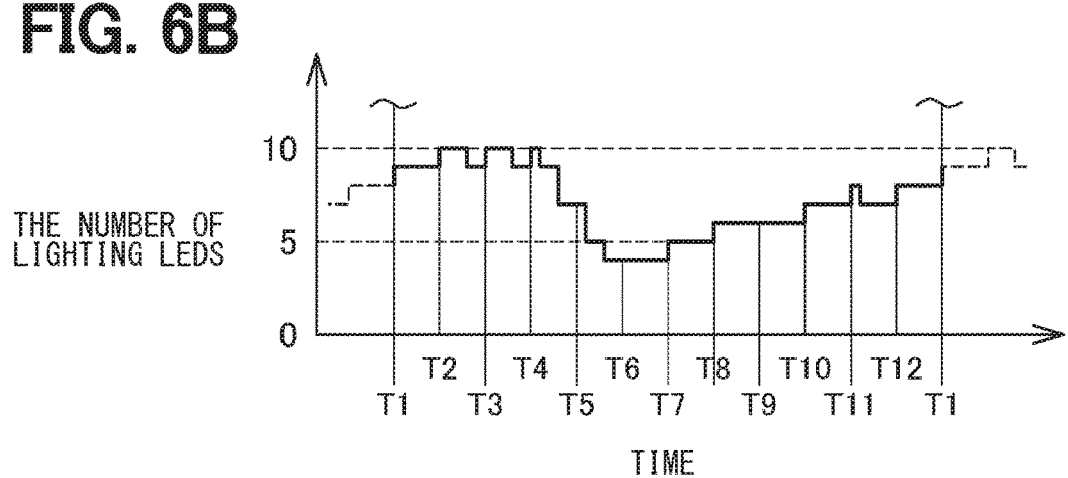
FIG. 6B is a diagram showing a state in which the number of lighting LEDs of the vehicle front lighting apparatus changes with the passage of time.

When the lighting schedule of the LED 1 to the LED 12 is determined, the number of LEDs to be turned on (hereinafter, referred to as the number of lighting LEDs) changes with the passage of time. FIG. 6B shows a state in which the number of lighting LEDs changes every moment with the passage of time.

As described above with reference to FIGS. 3A and 3B, the resistance value of the path through which the current flows is proportional to the number of lighting LEDs. Therefore, when the voltage value of the voltage value control unit 26 is controlled so that the current value detected by the current value detection unit 25 reaches a predetermined target current value while turning on or off the LED 1 to the LED 12 according to the lighting schedule shown in FIG. 6A, the voltage value becomes a voltage value that changes in proportion to the number of lighting LEDs.

Upon receiving the light distribution pattern from the lamp ECU 50, the vehicle front lighting apparatus 100 according to the first embodiment sets the control terminals of the switch elements SW1 to SW12 to the low state or the high state in accordance with the lighting schedule determined as described above. With the above operation, the front of the vehicle 1 can be illuminated with the light distribution pattern designated by the lamp ECU 50.

The LED 1 to the LED 12 of the LED array 10 and the switch elements SW1 to SW12 of the control module 20 are connected to each other by the multiple bypass wirings 21*a* to 21*m*. When a disconnection occurs in any of the bypass wirings 21*a* to 21*m*, the front side cannot be illuminated with the light distribution pattern designated by the lamp ECU 50, and therefore, if the disconnection occurs, there is a need to be able to detect the disconnection quickly.

On the other hand, as described above, the number of LEDs mounted on the LED array 10 tends to increase, and as the number of LEDs increases, the number of bypass wirings also increases, so that detection of disconnection becomes difficult. Therefore, the vehicle front lighting apparatus 100 according to the first embodiment employs the following method in order to be able to quickly and easily detect the disconnection in the bypass wiring even if the number of LEDs mounted on the LED array 10 increases.

Figure 7A:
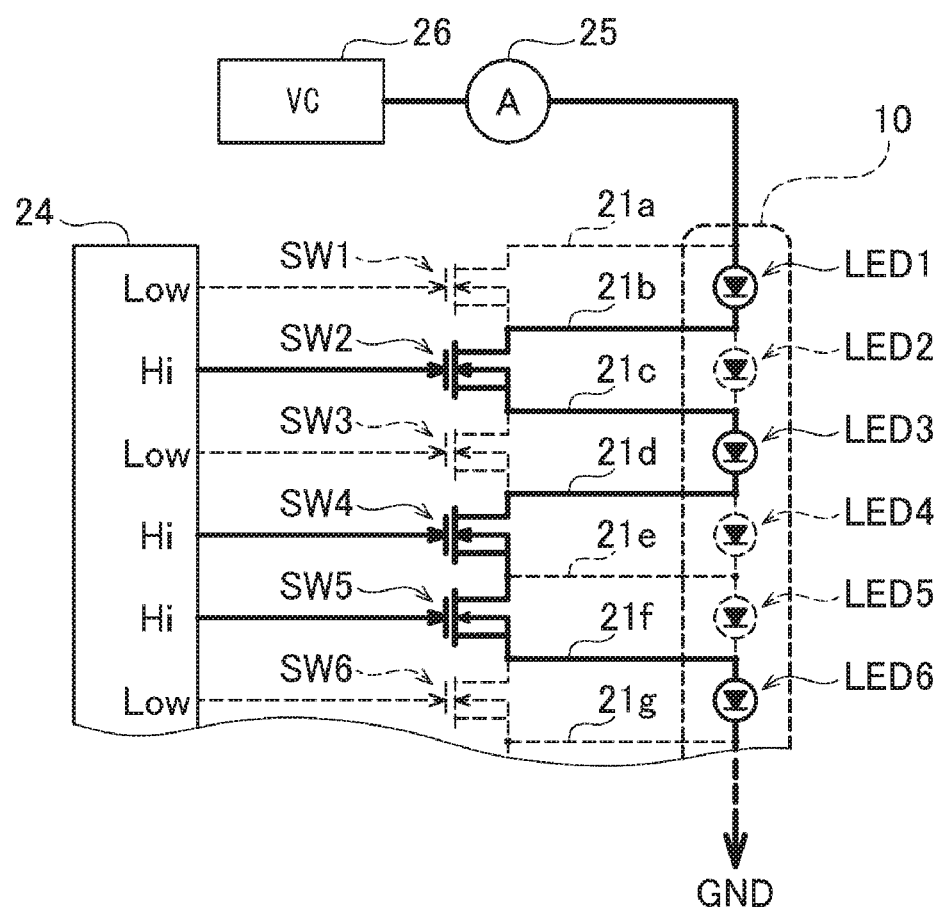
FIG. 7A is an illustrative diagram showing a condition in which no disconnection occurs in the bypass wiring.
Figure 7B:
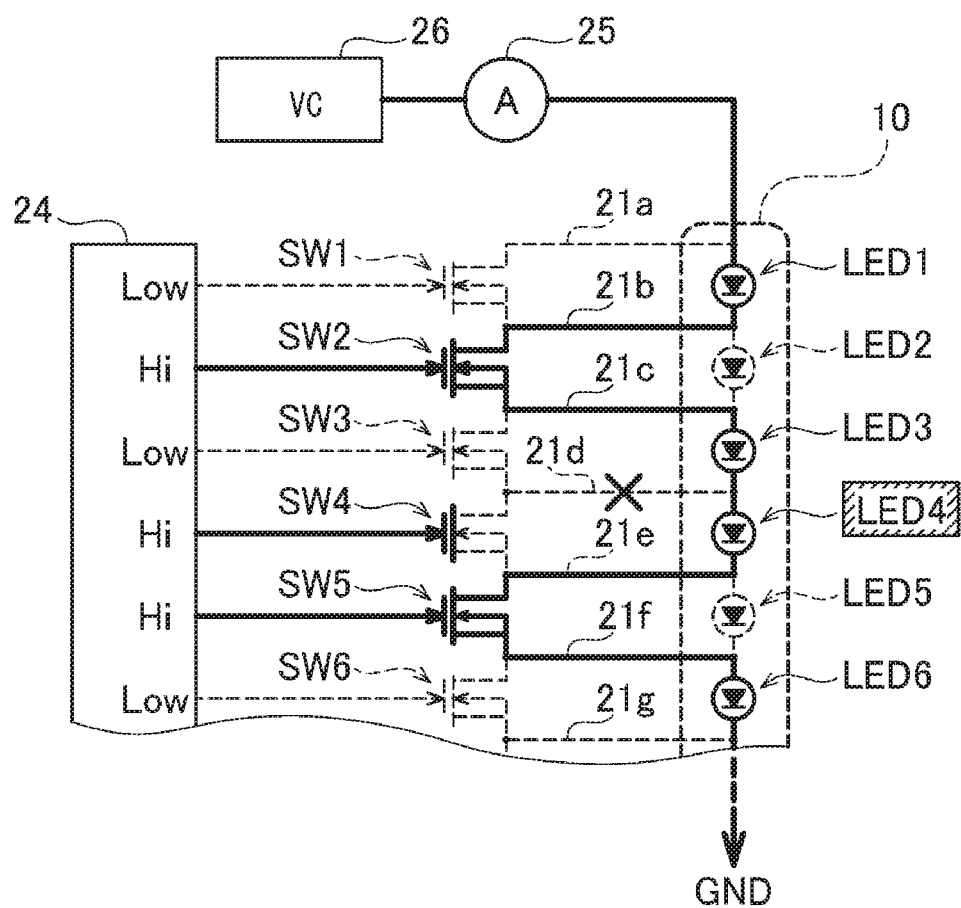
FIG. 7B is an illustrative diagram showing an exemplary effect of the disconnection of the bypass wiring on the operation of lighting the multiple LEDs of the LED array.

FIGS. 7A and 7B exemplify a state in which a path through which a current flows changes due to occurrence of a disconnection in the bypass wiring. As described above, the 12 LEDs of the LED 1 to the LED 12 are connected to the LED array 10 according to the first embodiment, but in order to avoid complication of illustration, the LED 7 to the LED 12 is not illustrated in FIGS. 7A and 7B as in FIGS. 3A and 3B. Correspondingly, in the description in FIGS. 7A and 7B as well, it is assumed that six LEDs of the LED 1 to the LED 6 are connected in series in the LED array 10, and six switches of the element SW1 to the switch element SW6 are provided.

FIG. 7A shows a condition in which disconnection does not occur. As shown in FIG. 7A, when the control terminals of the switch elements SW1, SW3, and SW6 are set to a low state and the control terminals of the switch elements SW2, SW4, and SW5 are set to a high state, a current flows through a path indicated by a thick solid line in the drawing. As a result, the LED 1, the LED 3, and the LED 6 is turned on and the LED 2, the LED 4, and the LED 5 are turned off.

In this situation, it is assumed that a disconnection occurs in the bypass wiring 21*d*. As shown in FIG. 7A, since the bypass wiring 21*d* is a path for allowing the current flowing through the LED 4 to bypass the LED 4, if the bypass wiring 21*d* is disconnected, the current cannot bypass the LED 4. As a result, even though the control terminal of the switch element SW4 is in the high state and the switch element SW4 is in the closed state (that is, the conductive state), a current flows through the LED 4 and the LED 4 is turned on.

A thick solid line shown in FIG. 7B represents a path through which a current flows at this time. In addition, a mark X in the drawing indicates that a disconnection occurs in the bypass wiring 21*d*. Further, the LED 4 surrounded in the drawing indicates that the LED 4 is actually turned on although the LED 4 is to be turned off naturally in response to the switch element SW4 being brought into the closed state.

In FIG. 7B, a case in which the disconnected bypass wiring 21*d* is a part of the path for bypassing the LED 4 will be described. When the bypass wiring 21*d* which allows the current to bypass the LED 4 is disconnected, the current cannot bypass the LED 4 and flows through the LED 4, as a result of which the LED 4 is turned on. The same applies when the disconnected bypass wiring 21*d* is a part of the path for bypassing the LED 3.

Figure 8A:
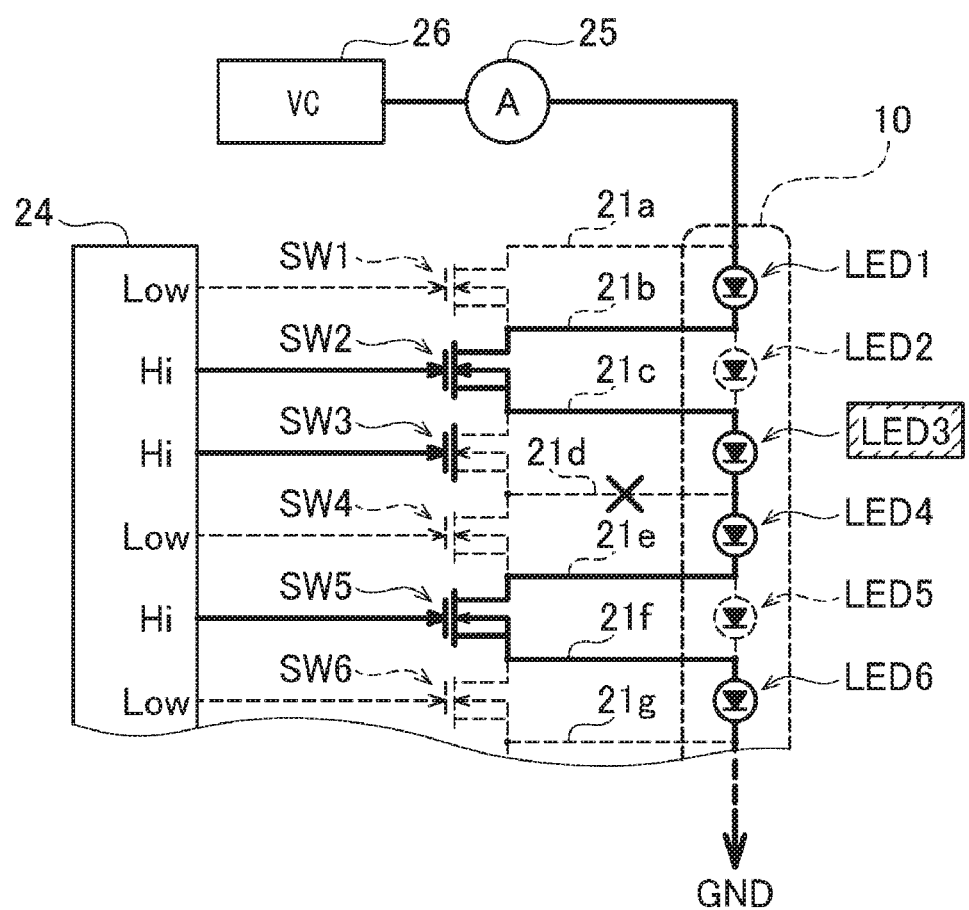
FIG. 8A is an illustrative diagram showing another exemplary effect of the disconnection of the bypass wiring on the operation of lighting the multiple LEDs of the LED array.

FIG. 8A shows a case in which the switch element SW3 on an upstream side of the disconnected bypass wiring 21*d* is in a closed state (that is, the control terminal is in a high state), and the switch element SW4 on a downstream side is in an opened state (that is, the control terminal is in a low state). Since the switch element SW3 is in the closed state, the current bypasses the LED 3 originally, but the current cannot bypass the LED 3 because the bypass wiring 21*d*, which is a part of the bypass path, is disconnected. As a result, a current flows through a path indicated by a thick solid line in FIG. 8A, and the LED 3 is turned on. In FIG. 8A, the LED 3 surrounded in FIG. 8A indicates that the LED 3 is actually turned on even though the LED 3 is to be turned off naturally in response to the switch element SW3 being brought into the closed state.

Figure 8B:
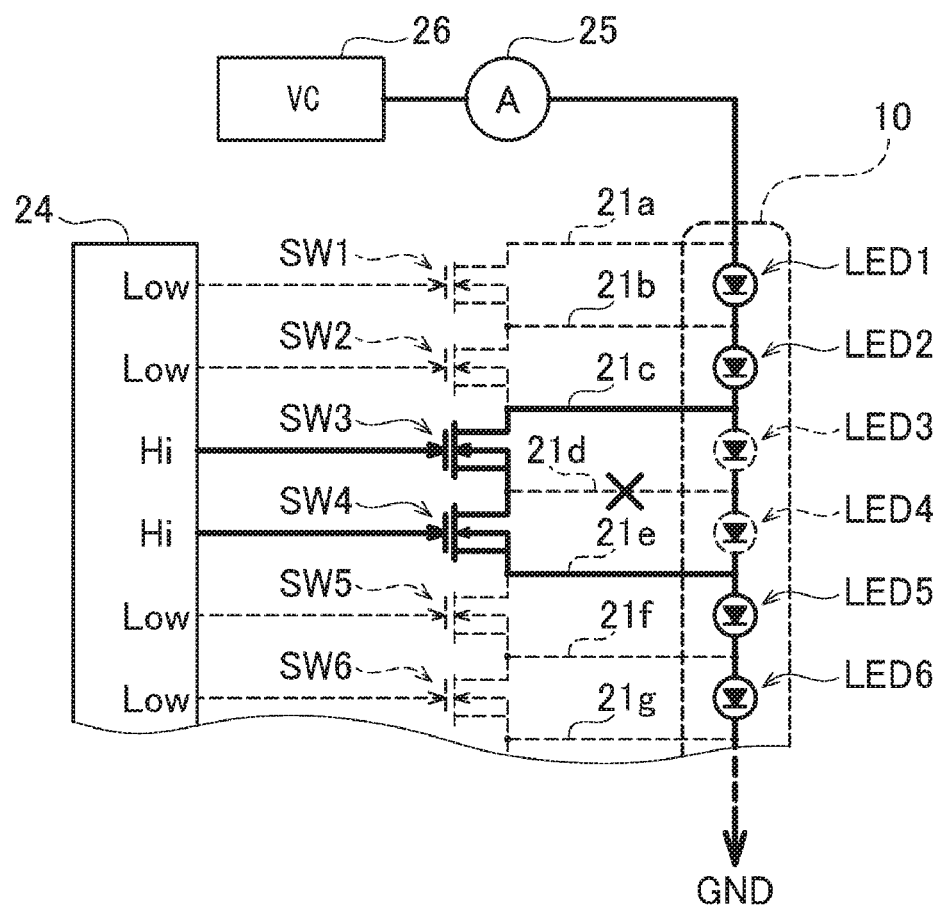
FIG. 8B is an illustrative diagram showing another exemplary effect of the disconnection of the bypass wiring on the operation of lighting the multiple LEDs of the LED array.

On the other hand, FIG. 8B shows a situation in which both the switch element SW3 on the upstream side and the switch element SW4 on the downstream side of the disconnected bypass wiring 21*d* become brought into the closed state. Since the switch element SW3 and the switch element SW4 are brought into the closed state, the current bypasses the LED 3 and the LED 4. For that reason, since the bypass wiring 21*d* drawn from between the LED 3 and the LED 4 does not form a part of a path through which the current bypasses the LED 3 and the LED 4, even if a disconnection occurs in the bypass wiring 21*d*, the LED 3 and the LED 4 remain turned off.

Contrary to the case shown in FIG. 8B, when both the switch element SW3 on the upstream side and the switch element SW4 on the downstream side of the disconnected bypass wiring 21*d* are put into the opened state, the current does not bypass the LED 3 and the LED 4 in the first place. For that reason, since the bypass wiring 21*d* does not form a part of the bypass path of the current, even if a disconnection occurs in the bypass wiring 21*d*, the LED 3 and the LED 4 remain turned on.

As is obvious from the above description, when a disconnection occurs in a certain bypass wiring, if one of the LED on the upstream side and the LED on the downstream side of the bypass wiring is turned on and the other is turned off, both of the LEDs are turned on. When both LEDs are to be turned on or off, both LEDs can be turned on or off as intended.

Therefore, even if it is attempted to turn on and off the LED 1 to the LED 12 according to a predetermined lighting schedule, the number of LEDs actually turned on (hereinafter, referred to as the number of actual lighting LEDs) is larger than the number of lighting LEDs determined according to the lighting schedule if there is a disconnected bypass wiring.

Figure 9A:
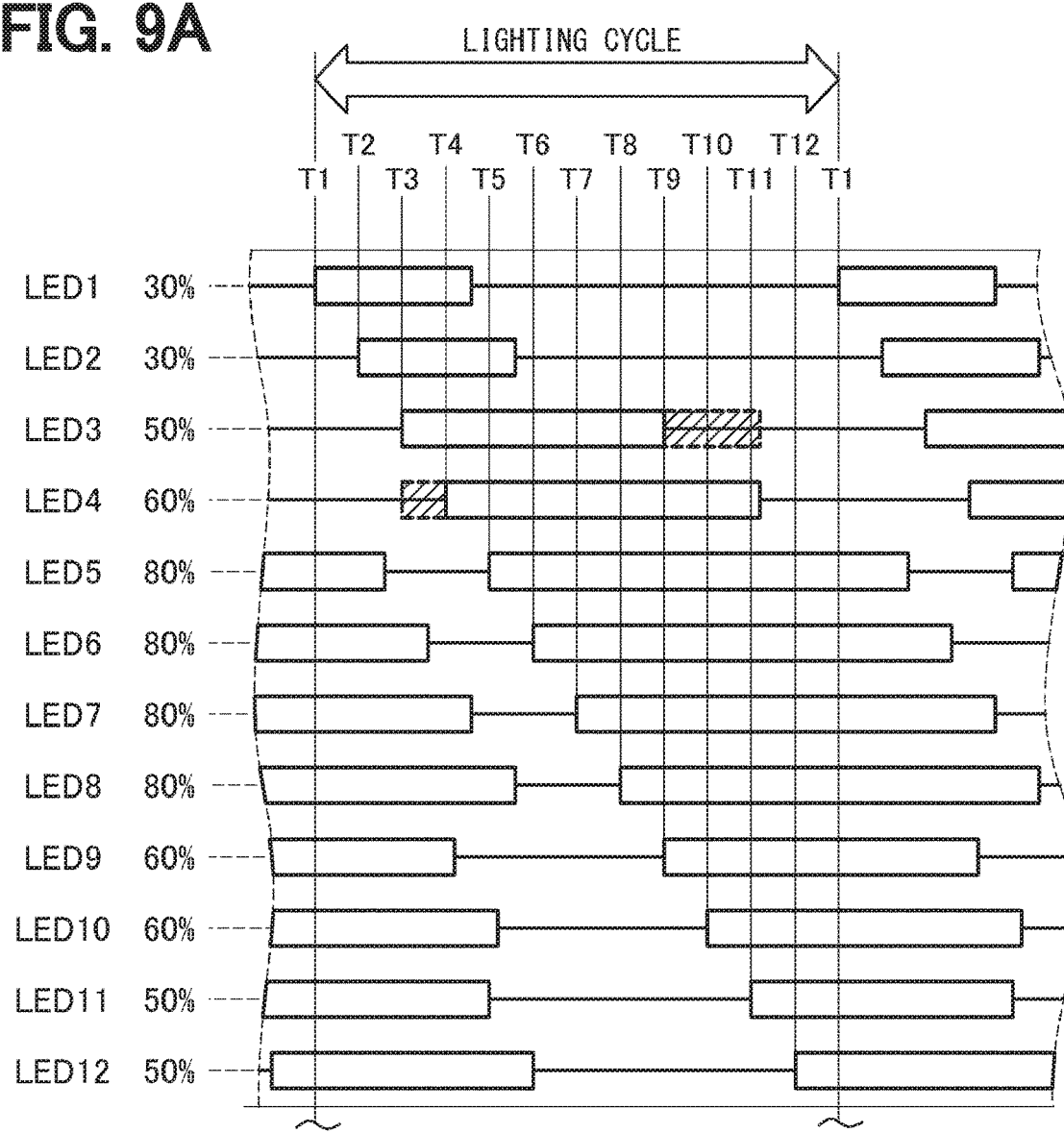
FIG. 9A is an illustrative diagram of a principle of detecting whether there is a disconnection in a bypass wiring by the vehicle front lighting apparatus according to the first embodiment.

FIG. 9A illustrates an example in which the LED 1 to the LED 12 is turned on and off according to the lighting schedule shown in FIG. 6A while the bypass wiring 21*d* led out from between the LED 3 and the LED 4 is disconnected. Hatched portions in FIG. 9A indicate that the LEDs are turned on unintentionally because the bypass wiring 21*d* is disconnected. For example, the LED 4 is turned on together with the LED 3 because the LED 3 is turned on despite not yet a timing when the LED 4 is turned on. In addition, the LED 3 remains turned on because the LED 4 still remains turned on despite a timing at which the LED 3 is to be turned off.

As a result, the number of actual lighting LEDs that the LEDs are actually turned on is larger than the number of lighting LEDs that the LEDs attempt to be turned on according to the lighting schedule. Shaded portions in FIG. 9B indicates the number of lighting LEDs increased due to disconnection. As described above with reference to FIGS. 3A and 3B, since the voltage value control unit 26 controls the voltage value to be applied to the LED array 10 so that the value of current flowing through the LEDs becomes the target current value, the voltage value to be applied by the voltage value control unit 26 is proportional to the number of LEDs to be actually turned on (that is, the number of actual lighting LEDs).

Therefore, if the voltage value applied to the LED array 10 by the voltage value control unit 26 increases or decreases in accordance with a variation in the number of lighting LEDs, which is determined according to the lighting schedule, the disconnection does not occur, but if the variation in the number of lighting LEDs and the increase or decrease of the voltage value do not match each other (for example, if the increase or decrease of the voltage value increases or increases with respect to the variation in the number of lighting LEDs), it can be determined that the disconnection has occurred. Therefore, every time any one of the LEDs is lit, the voltage value applied to the LED array 10 is detected in accordance with the lighting schedule illustrated in FIG. 9A, and it is determined whether the voltage value matches the number of LEDs to be lit.

Figure 10A:
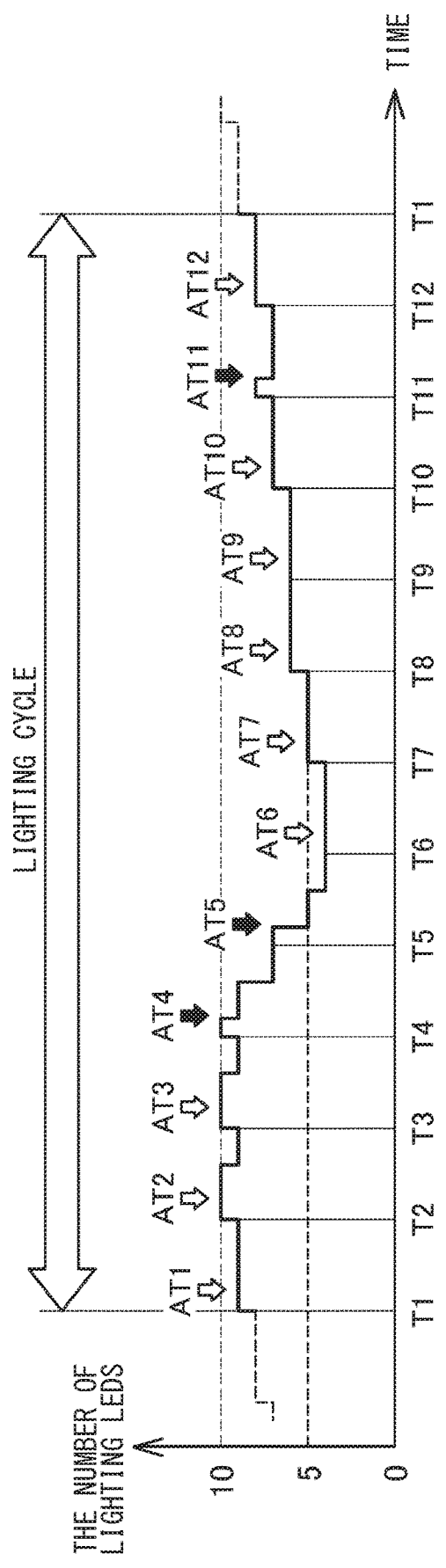
FIG. 10A is an illustrative diagram of a post-lighting timing at which the vehicle front lighting apparatus detects a voltage value and the number of lighting LEDs according to the first embodiment.

FIG. 10A illustrates a timing at which the vehicle front lighting apparatus 100 according to the first embodiment detects the voltage value applied to the LED array 10 and the number of lighting LEDs. As described above, the LED 1 is turned on at the timing T1, and the LED 2 is turned on at the timing T2. Similarly, the LED 3 to the LED 12 are turned on at the timings T3 to T12. Therefore, the voltage value and the number of lighting LEDs are detected at a timing when a predetermined change time CT has elapsed from the timings of T1 to T12. Since the timings of T1 to T12 are timings at which any of the LEDs is turned on, the timings of T1 to T12 are hereinafter referred to as "lighting timing". The timing at which the change time CT has elapsed from the lighting timing is referred to as "post-lighting timing". In this example, the change time CT is set to the following time. For example, the LED 1 is turned on at the lighting time of T1, and the number of lighting LEDs increases accordingly. Then, since the value of the current flowing through the LED array 10 decreases, the voltage value control unit 26 increases the voltage value applied to the LED array 10. However, since the voltage value control unit 26 detects that the current has decreased and increases the voltage value, the voltage value increases later than the increase in the number of lighting LEDs.

Figure 10B:
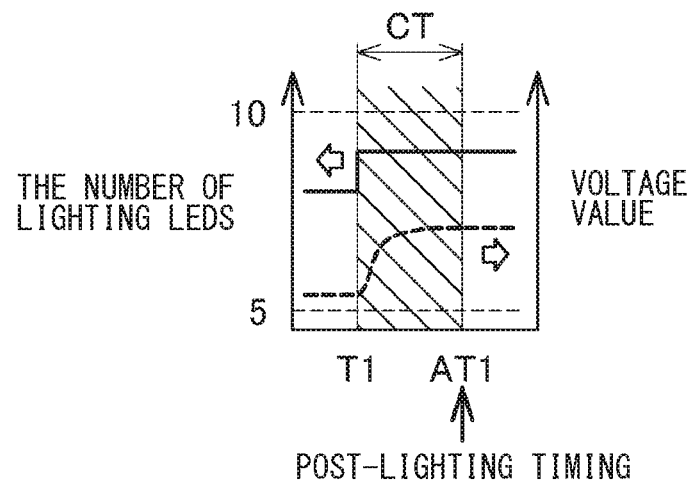
FIG. 10B is an enlarged view showing a change in the number of lighting LEDs before and after a timing T1 in FIG. 10A and a change in the voltage value to be applied.

FIG. 10B shows a state in which the voltage value increases with a delay as the number of lighting LEDs increases at the lighting timing of T1. The change time CT is set to a time during which the increase of the voltage value may be considered to be stable with a margin. Therefore, if the voltage value is detected at the post-lighting timing after the change time CT has elapsed from the lighting timing, the voltage value that has changed in accordance with the number of lighting LEDs can be detected normally.

Figure 10C:
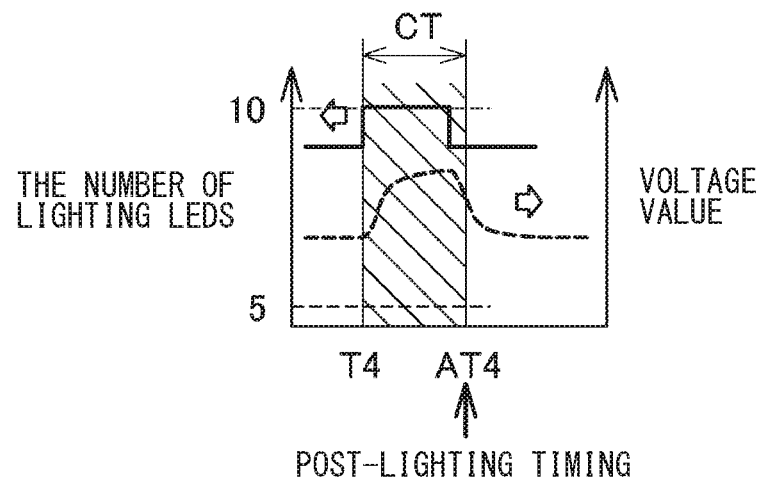
FIG. 10C is an enlarged view showing a change in the number of lighting LEDs before and after a timing T4 in FIG. 10A and a change in the voltage value to be applied.

However, in the case where there is an LED to be turned off between the lighting timing and the post-lighting timing, there is a possibility that a voltage value in the course of change due to the turning off of the LED is detected. FIG. 10C illustrates a state in which the number of lighting LEDs changes in a period from a time prior to the lighting timing of T4 to a post-lighting timing of AT4, and the voltage value changes accordingly. As shown in the figure, the number of lighting LEDs is increased at the lighting timing of T4, and the voltage value is increased accordingly. However, prior to the post-lighting timing of AT4, any of the LEDs is turned off, the number of lighting LEDs is reduced, and the voltage value is also reduced accordingly. For that reason, when the voltage value is detected at the post-lighting timing of AT4, the voltage value being decreased is detected, and an erroneous voltage value is detected.

The same applies to post-lighting timings of AT5 and AT11 indicated by black arrows in FIG. 10A. Therefore, in the vehicle front lighting apparatus 100 according to the first embodiment, the timing at which the LED is turned off is changed with respect to the post-lighting timings of AT4, AT5, and AT11 indicated by black arrows in FIG. 10A.

Figure 11A:
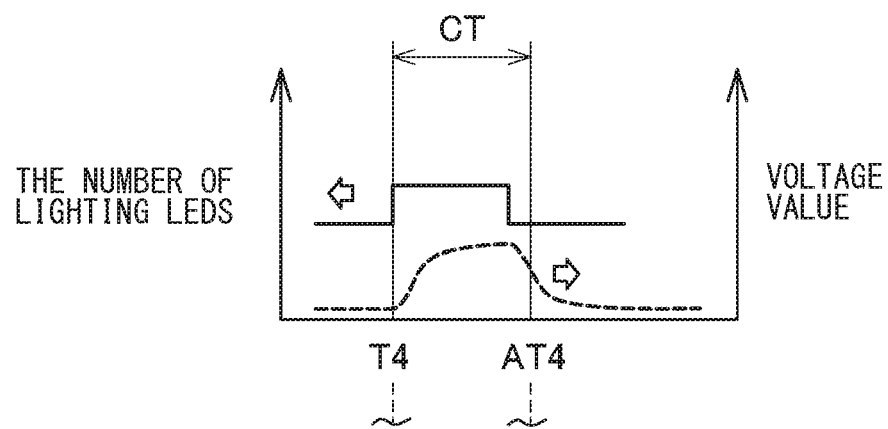
FIG. 11A is an illustrative diagram illustrating a state in which the vehicle front lighting apparatus moves a timing at which the LEDs are turned off according to the first embodiment.
Figure 11B:
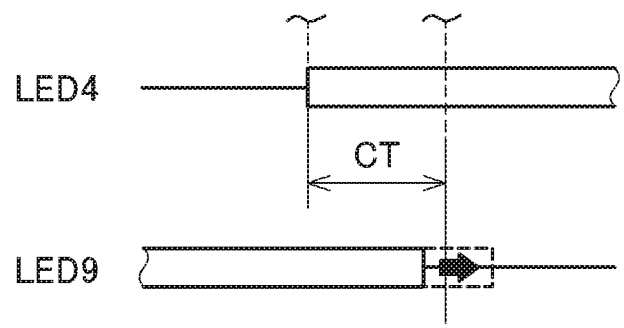
FIG. 11B is an illustrative diagram illustrating a state in which the vehicle front lighting apparatus moves the timing at which the LEDs are turned off according to the first embodiment.

FIGS. 11A and 11B show how the timing at which the LEDs are turned off is changed by exemplifying the post-lighting timing of AT4. As shown in FIG. 11A, the reason why the number of lighting LEDs is increased at the lighting timing of T4 is that the LED 4 is turned on as shown in FIG. 11B. Further, as shown in FIG. 11A, the reason why the number of lighting LEDs is decreased in a period from the lighting timing of T4 to the post-lighting timing of AT4 is because the LED 9 is turned off in that period, as shown in FIG. 11B.

Therefore, as indicated by a dashed line in FIG. 11B, the timing of turning off the LED 9 is moved to a timing later than the post-lighting timing of AT4. Alternatively, the timing at which the LED 9 is turned off may be moved to a timing prior to the timing of lighting of T4. Further, the timing at which the LED 9 is turned off may be moved to a side where the movement amount is small.

When moving, the timing of turning off the LED 9 may be moved while the timing of turning on the LED 9 is fixed, or the timing of turning off the LED 9 may be moved by moving the timing of turning on the LED 9.

When the turning-off timing is moved while the turning-on timing is fixed, a lighting duty ratio of the LED changes, and thus a lighting intensity of the LED changes. However, since the change in the lighting intensity is only about 1 to 2% in terms of the lighting duty ratio, the light distribution pattern specified by the lamp ECU 50 is not collapsed. Since the lighting timing can be kept fixed, a process of moving the turning-off timing can be realized by a simple process.

On the other hand, when the turning-off timing is moved by moving the turning-on timing, the lighting duty ratio of the LEDs does not change, so that a light distribution pattern specified by the lamp ECU 50 can be accurately realized.

In FIGS. 11A and 11B, the case in which the timing of turning off the LED is moved with respect to the post-lighting timing of AT4 has been described, but the timing of turning off the LED is moved similarly with respect to the post-lighting timings of AT5 and AT11. In this manner, the voltage value is detected at the respective post-lighting timings of AT1 to AT12, the voltage value that has been changed in accordance with the change in the number of lighting LEDs can be detected. If it is determined whether the detected voltage value matches the number of lighting LEDs, it can be accurately detected whether there is a disconnection.

The vehicle front lighting apparatus 100 according to the first embodiment performs the detection of the disconnection by the method described above in a lighting control process to be described below.

Figure 12:
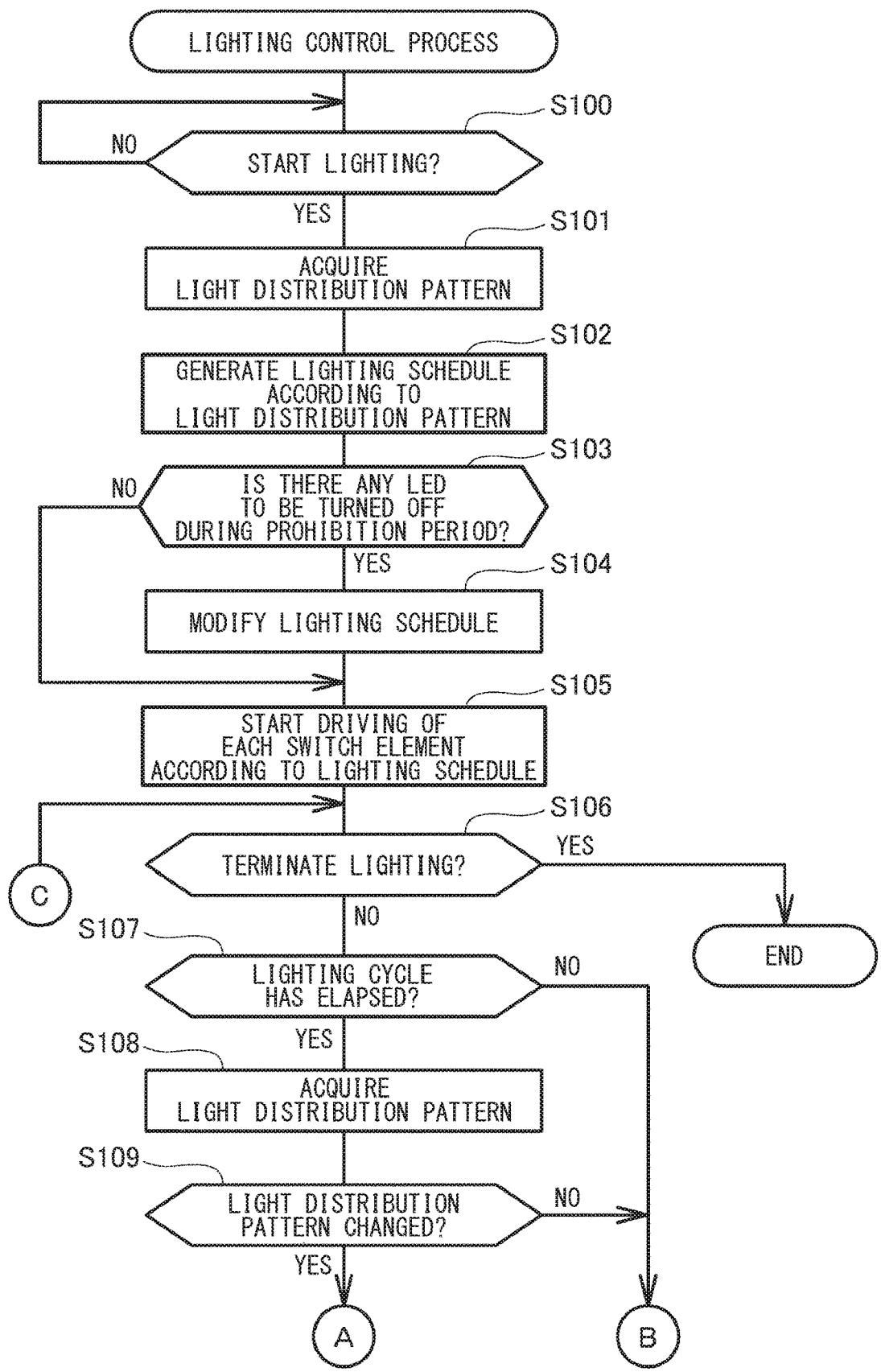
FIG. 12 is a flowchart showing a first half of a lighting control process executed by the vehicle front lighting apparatus according to the first embodiment.
Figure 13:
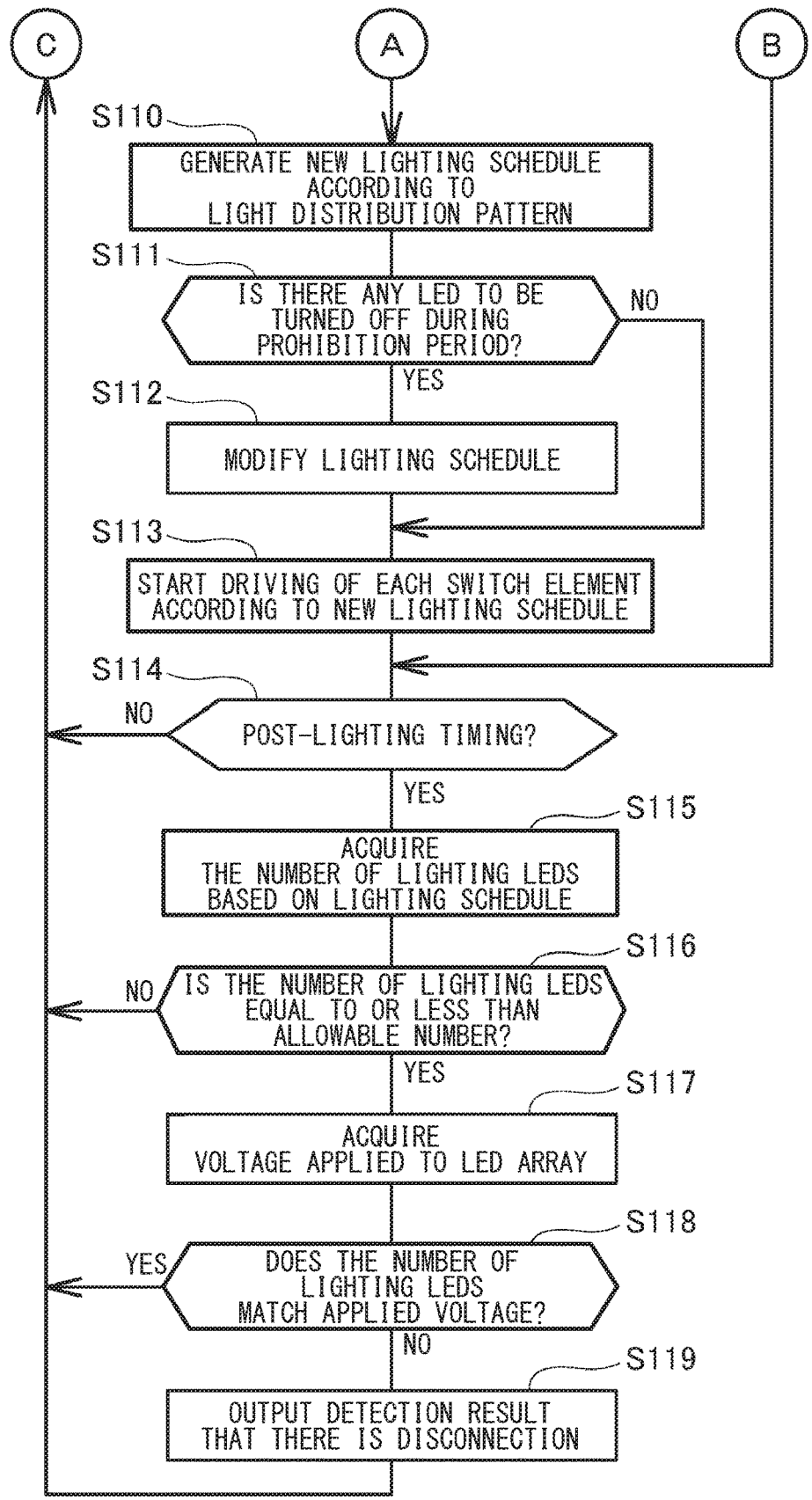
FIG. 13 is a flowchart showing a second half of the lighting control process executed by the vehicle front lighting apparatus according to the first embodiment.

FIGS. 12 and 13 show flowcharts of a lighting control process to be executed by the vehicle front lighting apparatus 100 according to the first embodiment to illuminate a region in front of the vehicle 1 by use of the LED array 10.

As shown in the figure, when the lighting control process is started, first, it is determined whether to start lighting by use of the LED array 10 (S100). In the present embodiment, the lamp ECU 50 determines whether the lighting is required based on the information acquired from the in-vehicle LAN 30, and outputs the result to the vehicle front lighting apparatus 100. Therefore, when an instruction to start lighting is not received from the lamp ECU 50, it is determined that lighting is not to be started (NO in S100), and the lighting control process is in a waiting state while repeating the same determination until the instruction to start lighting is received.

When an instruction to start lighting is received, it is determined to start lighting (YES in S100), and the light distribution pattern are acquired from the lamp ECU 50 (S101). As described above, the light distribution pattern is information indicating the lighting intensity with which the multiple LEDs of the LED array 10 are turned on.

Next, a lighting schedule corresponding to the light distribution pattern is generated (S102). As described above, the lighting schedule is data indicating a schedule of timings at which the multiple LEDs forming the LED array 10 are turned on and turned off. As exemplified in FIG. 6A, when the light distribution pattern is a pattern in which a lighting duty ratio of the LED 1 and the LED 2 is 30%, the lighting duty ratio of the LED 3 is 50%, the lighting duty ratio of the LED 4 is 60%, the lighting duty ratio of the LED 5 to the LED 8 is 80%, the lighting duty ratio of the LED 9 and the LED 10 is 60%, and the lighting duty ratio of the LED 11 to the LED 12 is 50%, the lighting schedule as shown in FIG. 6A is generated.

Next, it is determined whether there are LEDs scheduled to be turned off during a prohibition period of the generated lighting schedule (S103). In this example, the prohibition period is a period from a timing at which any one of the LEDs is turned on (that is, the lighting timing) to a post-lighting timing at which the change time CT has elapsed. Since the lighting schedule sets the turning-on timing and the turning-off timing for each LED of the LED 1 to the LED 12, it can be easily determined whether there is an LED to be turned off during the prohibition period by checking the lighting schedule.

As a result, when there is an LED to be turned off during the prohibition period (YES in S103), the lighting schedule is modified by changing the timing of turning off the LED scheduled to be turned off during the prohibition period as described above with reference to FIGS. 11A and 11B (S104).

On the other hand, if there is no LED to be turned off during the prohibition period (NO in S103), the lighting schedule is not modified.

Subsequently, driving of the switch elements SWs corresponding to the respective LEDs is started in accordance with the lighting schedule (S105). In other words, in accordance with the lighting schedule, the operation of setting the control terminal of the switch element SW of the LED to be turned on to the low state and setting the control terminal of the switch element SW of the LED to be turned off to the high state is repeated in the lighting cycle.

Next, it is determined whether an instruction is given from the lamp ECU 50 to terminate the lighting (S106), and when no instruction is given from the lamp ECU 50 to terminate the lighting, it is determined that the lighting is not terminated (NO in S106), and it is then determined whether the lighting cycle has elapsed (S107).

When the lighting cycle has not yet elapsed since the driving of the switch elements SW is started, a determination of "NO" is made in S107, and it is determined whether the present timing is a timing for detecting the disconnection (that is, the post-lighting timing of one of AT1 to AT12) is set (S114 in FIG. 13). The post-lighting timing is set to the timing at which the change time CT has elapsed from the lighting timings of T1 to T12 (see FIG. 10B).

As a result, when the present timing is not the post-lighting timing (NO in S114 of FIG. 13), the flow returns to S106 in FIG. 12, and it is determined whether the lighting is to be terminated. As a result, when the lighting is not finished (NO in S106), it is determined whether the lighting cycle has elapsed (S107), and when the lighting cycle has not elapsed (NO in S107), it is determined whether the post-lighting timing, which is the timing for detecting disconnection, has come (S114 in FIG. 13).

Even while the above operation is repeated, the driving of the switch elements SWs started in S105 in FIG. 12 is continued according to the lighting schedule.

As a result, it is determined that the present timing has come to the post-lighting timing (YES in S114 of FIG. 13), so that the number of lighting LEDs (that is, the number of LEDs to be turned) is acquired (S115). The number of lighting LEDs can be acquired based on the lighting schedule.

Figure 9B:
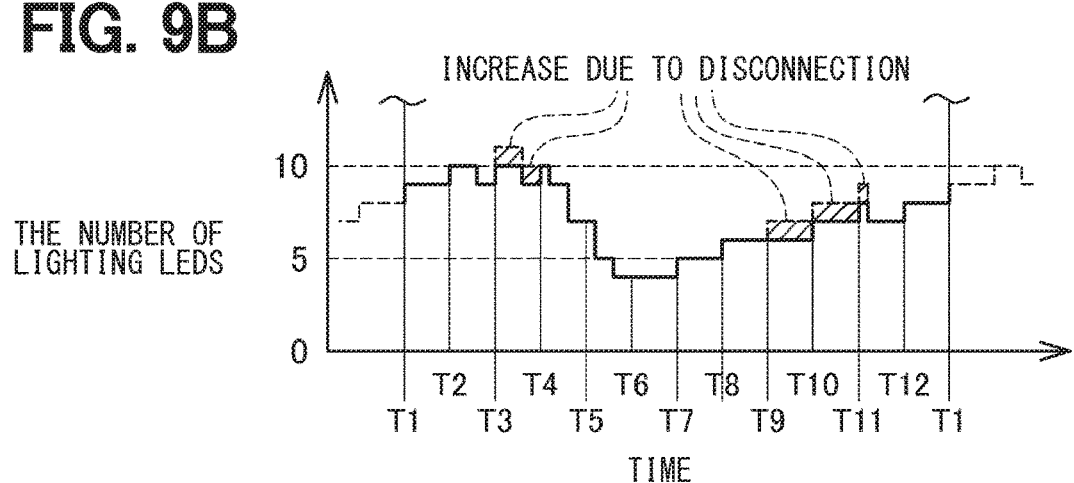
FIG. 9B is an illustrative diagram of the principle of detecting whether there is a disconnection in a bypass wiring by the vehicle front lighting apparatus according to the first embodiment.

If a disconnection does not occur, the number of lighting LEDs obtained in this way matches the number of LEDs actually turned on (that is, the number of actual lighting LEDs), but if a disconnection occurs, the number of actual lighting LEDs becomes larger than the number of lighting LEDs obtained on the basis of the lighting schedule (see FIGS. 9A and 9B). Since the voltage value applied to the LED array 10 by the voltage value control unit 26 is determined according to the number of actual lighting LEDs, it can be determined whether there is a disconnection by determining whether the voltage value applied to the LED array 10 matches the number of lighting LEDs obtained according to the lighting schedule.

However, in the first embodiment, prior to determining whether there is a disconnection, it is determined whether the number of lighting LEDs obtained according to the lighting schedule is smaller than a predetermined allowable number (S116). When the number of lighting LEDs is larger than the allowable number (NO in S116), it is again determined whether to terminate the lighting without determining whether there is a disconnection (S106 in FIG. 12). The reason is as follows:

As described above with reference to FIGS. 9A and 9B, in the vehicle front lighting apparatus 100 according to the present embodiment, when a disconnection occurs in any of the bypass wirings 21a to 21m, the LEDs that are not intended to be turned on are turned on, so that the number of actual lighting LEDs is larger than the number of lighting LEDs based on the lighting schedule. As a result, a resistance value of the LED array 10 increases, and the voltage value applied by the voltage value control unit 26 also increases.

In this example, the resistance values of the individual LEDs vary. Therefore, if N number of lighting LEDs happen to be LEDs having a larger resistance value, the resistance value becomes equivalent to (N+1) number of LEDs, and it may be erroneously determined that a disconnection occurs. On the contrary, since (N+1) number of LEDs which are turned on due to disconnection happen to be LEDs having a smaller resistance value, a resistance value corresponding to N number of LEDs is obtained, and it may be erroneously determined that a disconnection does not occur. The possibility of such erroneous determination increases as the number of lighting LEDs increases.

Therefore, in the present embodiment, an appropriate allowable number is determined in advance in accordance with a variation in the resistance value of the LEDs, and when the number of lighting LEDs, which is determined according to the lighting schedule, is larger than the allowable number (NO in S116), it is not determined whether there is a disconnection in order to avoid an erroneous detection. Incidentally, the allowable number of the present embodiment is set to 9.

On the other hand, when the number of lighting LEDs obtained on the basis of the lighting schedule is equal to or less than the allowable number (YES in S116), the voltage value applied to the LED array 10 is obtained (S117).

Then, it is determined whether the number of lighting LEDs obtained on the basis of the lighting schedule matches the obtained voltage value (S118). In other words, if the number of lighting LEDs is N, the average resistance value of the LEDs is R, a variation of the resistance value is dR, and a target current value flowing through the LEDs is I, a current value V applied to the LED array 10 should fall within the following Expression.

$$N \cdot (R-dR) \cdot I < V < N \cdot (R+dR) \cdot I \quad (1)$$

Therefore, when the voltage value acquired in S117 falls within a range satisfying Expression (1), it is determined that the number of lighting LEDs and the voltage value match each other (YES in S118), and when the voltage value does not fall within the range satisfying Expression (1), it is determined that the number of lighting LEDs and the voltage value do not match each other (NO in S118).

As described above with reference to FIGS. 9A and 9B, in the vehicle front lighting apparatus 100 according to the present embodiment, the number of LEDs to be turned on increases and does not decrease when a disconnection occurs in the bypass wirings 21a to 21m. Therefore, in S118, Expression (1) is replaced with the following expression.

$$V < N \cdot (R+dR) \cdot I \quad (2)$$

By use of the above expression, it may be determined whether the number of lighting LEDs matches the voltage value. This makes it possible to make a determination more quickly than in the case of using Expression (1).

As a result, when it is determined that the number of lighting LEDs and the voltage value do not match each other (NO in S118), the detection result of "with a disconnection" is output to the outside (for example, the lamp ECU 50 in FIG. 1B) (S119), and then the flow returns to S106 in FIG. 12, and it is determined whether the lighting is terminated.

On the other hand, when it is determined that the number of lighting LEDs and the voltage value match each other (YES in S118), the flow returns to S106 in FIG. 12 as it is without outputting the detection result, and it is determined whether the lighting is to be terminated.

As described above, in the lighting control process according to the present embodiment, when the driving of the switch elements SWs is started (S105) according to the lighting schedule corresponding to the light distribution pattern, whether there is a disconnection is detected by repeating the operation described above (S118 and S119 in FIG. 13).

When the lighting cycle has elapsed while repeating the above operation (YES in S107 of FIG. 12), the light distribution pattern is acquired from the lamp ECU 50 (S108).

Then, it is determined whether the newly acquired light distribution pattern has been changed from the previously acquired light distribution pattern (S109). As a result, when there is no change in the light distribution pattern (NO in S109), the series of processes described above (S114 to S119 in FIG. 13) is repeated until the lighting cycle has elapsed and the determination of "YES" is made in S107.

On the other hand, when the newly acquired light distribution pattern is changed from the previously acquired light distribution pattern (YES in S109), a new lighting schedule corresponding to the new light distribution pattern is generated (S110).

Subsequently, similarly to S103 described above, it is determined whether there is an LED scheduled to be turned off during the prohibition period of the newly generated lighting schedule (S111), and when there is an LED (YES in S111), the lighting schedule is modified by changing the timing of turning off the LED scheduled to be turned off during the prohibition period (S112). On the other hand, if there is no LED to be turned off during the prohibition period (NO in S111), the lighting schedule is not modified.

After the driving of the switching elements SW has been started (S113) according to the new lighting schedule, it is determined whether the post-lighting timing, which is the timing for detecting disconnection, has come (S114). As a result, when the post-lighting timing has not come (NO in S114), the flow returns to S106 in FIG. 12, and it is determined whether the lighting is to be terminated. On the other hand, when the present timing comes to the post-lighting timing (YES in S114), the number of lighting LEDs is acquired based on the lighting schedule (S115), and then the series of operations (S116 to S119) described above is performed. The above operation is repeated until the lighting is terminated.

When it is finally determined that the lighting is to be terminated (YES in S106 of FIG. 12), the lighting control process according to the first embodiment shown in FIGS. 12 and 13 is terminated.

As described above, the vehicle front lighting apparatus 100 according to the first embodiment can detect the occurrence of the disconnection quickly when the disconnection occurs in the bypass wirings 21a to 21m for controlling the lighting operation of the respective LEDs of the LED array 10 by performing the lighting control process described above.

Further, in detecting the disconnection, there is only a need to determine whether the number of LEDs to be lit in the LED array 10 matches the voltage value applied to the LED array 10, so that whether there is a disconnection can be detected easily and quickly.

Further, when the lighting schedule is generated, it is confirmed whether there is an LED to be turned off during the prohibition period, and when there is an LED to be turned off during the prohibition period, the timing of turning off the LED is changed. For that reason, the voltage value that has been changed with the change in the number of lighting LEDs, so that the erroneous voltage value is not detected to erroneously determine whether there is a disconnection.

It is needless to say, when the number of lighting LEDs to be turned on has exceeded the allowable number (NO in S116 of FIG. 13), it cannot be detected whether there is a disconnection, but the LEDs to be turned on change with the passage of time (see FIGS. 6A and 6B), and further vary depending on the light distribution pattern. Therefore, after a certain period of time has elapsed, it can be detected whether there is a disconnection.

Second Embodiment

In the vehicle front lighting apparatus 100 according to the first embodiment described above, whether there is a disconnection is determined based on whether the voltage value and the number of lighting LEDs, which are determined each time the post-lighting timings of AT1 to AT12 comes to, match each other.

On the other hand, whether there is a disconnection may be determined based on the amount of change between the voltage value and the number of lighting LEDs detected at the post-lighting timing and the voltage value and the number of lighting LEDs detected last time. This makes it possible to detect whether there is a disconnection even at a timing when the number of lighting LEDs exceeds a predetermined allowable number. Hereinafter, the second embodiment will be described.

Figure 14:
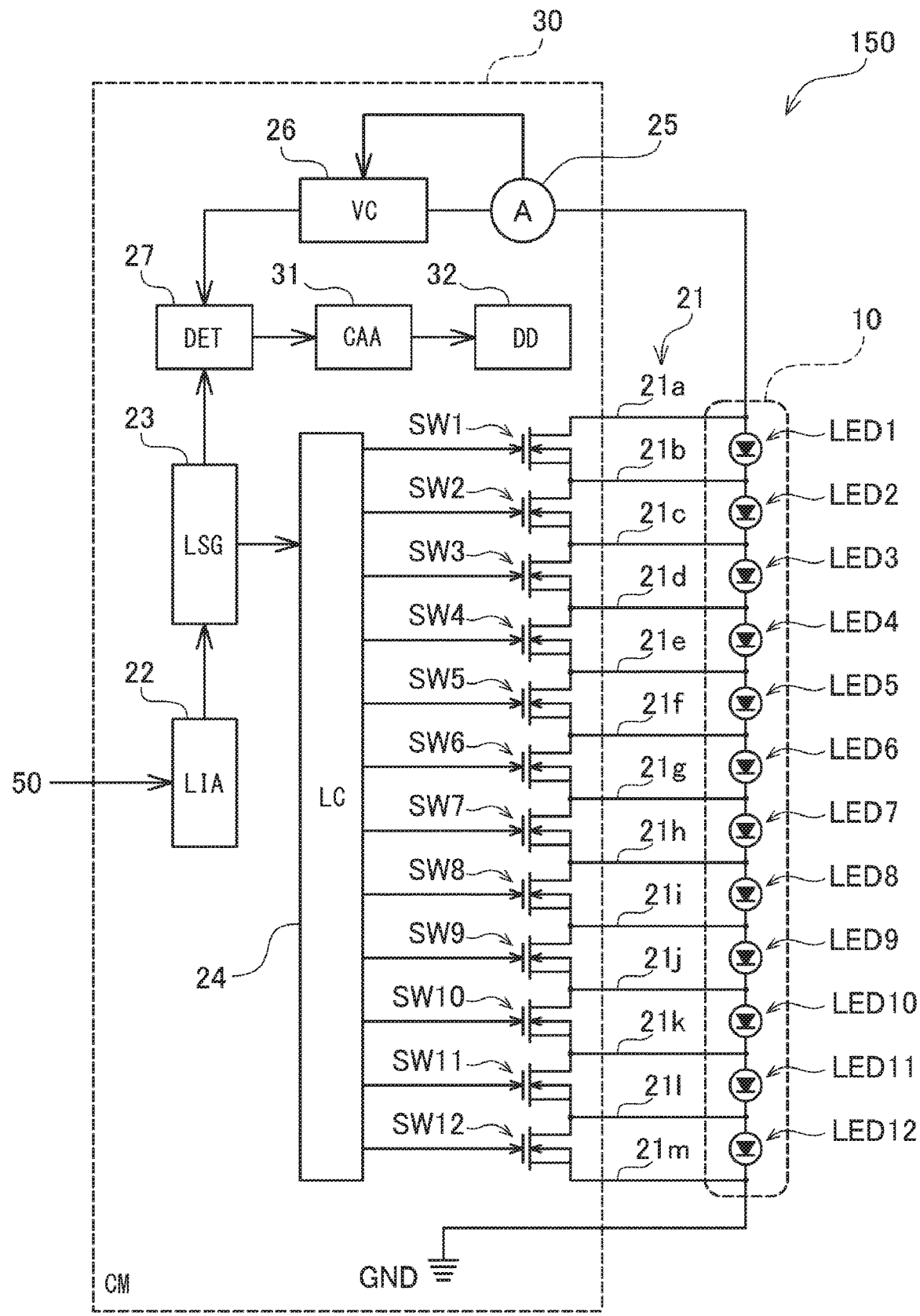
FIG. 14 is a block diagram showing an internal structure of a vehicle front lighting apparatus according to a second embodiment.

FIG. 14 shows a rough internal structure of the vehicle front lighting apparatus 150 according to the second embodiment described above. As shown in the figure, in the vehicle front lighting apparatus 150 according to the second embodiment, the control module 20 is changed to a control module 30 as compared with the vehicle front lighting apparatus 100 according to the first embodiment described above with reference to FIG. 2. The control module 30 according to the second embodiment is the same as the control module 20 according to the first embodiment except that a change amount acquisition unit 31 and a disconnection determination unit 32 are provided instead of the disconnection determination unit 28 provided in the control module 20 of the first embodiment.

As shown in FIG. 14, the control module (CM) 30 according to the second embodiment includes, in addition to switch elements SW1 to SW12, a lighting intensity acquisition unit (LIA) 22, a lighting schedule generation unit (LSG) 23, a lighting control unit (LC) 24, a current value detection unit 25, a voltage value control unit (VC) 26, a detection unit (DET) 27, the change amount acquisition unit (CAA) 31, and the disconnection determination unit (DD) 32. Among those components, the switch elements SW1 to SW12, the lighting intensity acquisition unit 22, the lighting schedule generation unit 23, the lighting control unit 24, the current value detection unit 25, the voltage value control unit 26, and the detection unit 27 are the same as those in the first embodiment, and therefore a description of those same components will be omitted. The change amount acquisition unit 31 corresponds to a "change amount detector" in the present disclosure, and the disconnection determination unit 32 corresponds to a "disconnection determiner" in the present disclosure.

The change amount acquisition unit 31 receives the number of lighting LEDs and the voltage value detected by the detection unit 27, and acquires the amount of change in the number of lighting and the voltage value. In other words, the detection unit 27 detects the number of the switch elements SW whose control terminals are in a low state (that is, the number of lighting LEDs) and the voltage value applied to the LED array 10 each time a predetermined change time elapses from a timing when any of the control terminals of the switch elements SW1 to SW12 is in the low state. Therefore, the change amount acquisition unit 31 receives the number of lighting LEDs and the voltage value detected by the detection unit 27 and compares the received number and voltage value with the number of lighting LEDs and the voltage value detected last time, thereby acquiring the amount of change in the number of lighting LEDs and the amount of change in the voltage value.

The disconnection determination unit 32 receives the amount of change in the number of lighting LEDs and the amount of change in the voltage value from the change amount acquisition unit 31, and determines whether those received amounts of change match each other, thereby detecting whether there is a disconnection in the bypass wirings 21a to 21m.

In the vehicle front lighting apparatus 150 according to the second embodiment, even when the number of lighting LEDs at the time that the detection unit 27 detects the voltage value exceeds a predetermined allowable number, whether there is a disconnection in the bypass wirings 21a to 21m can be easily and accurately detected for the following reasons.

Figure 15A:
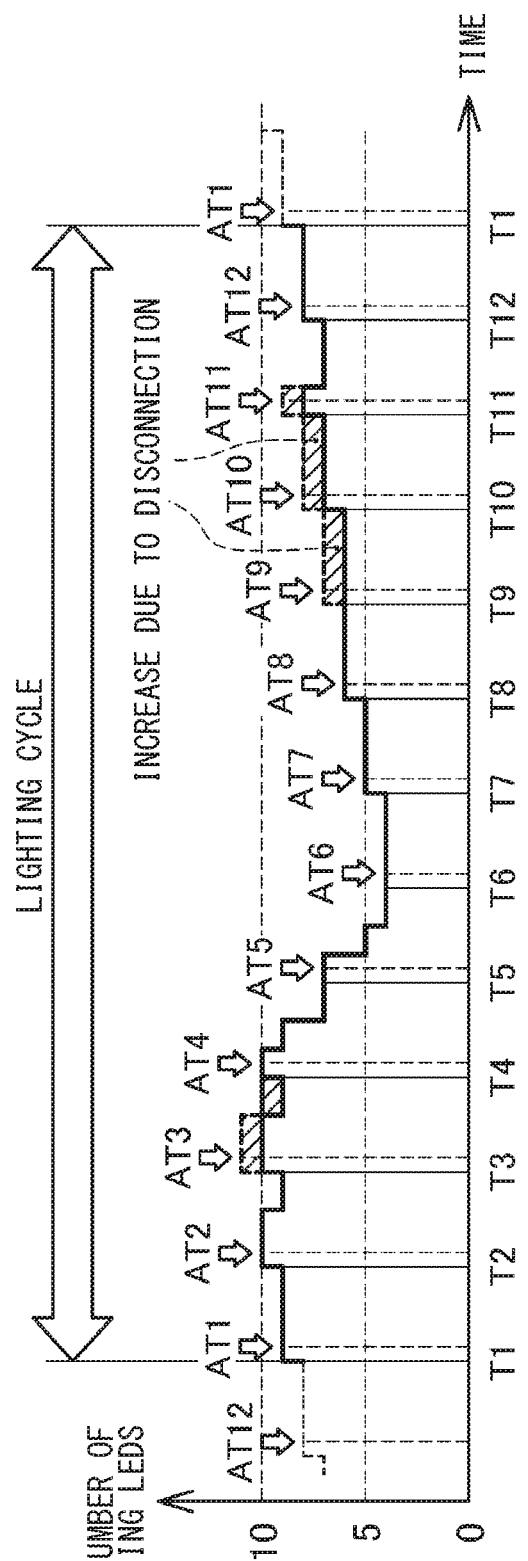
FIG. 15A is an illustrative diagram of a principle of detecting whether there is a disconnection in a bypass wiring by the vehicle front lighting apparatus according to the second embodiment.

FIG. 15A shows FIG. 9B with a time axis enlarged. A thick solid line in the figure represents the number of lighting LEDs according to the lighting schedule, and hatched portions in the figure represents portions where the number of lighting LEDs is increased due to an influence of disconnection. In addition, T1 to T12 indicated on a horizontal axis in the drawing are timings at which the LED 1 to the LED 12 are turned on, respectively. Further, the post-lighting timings of AT1 to AT12 where the change time CT described above (see FIG. 10B) has elapsed from the timings of T1 to T12 are timings at which the number of lighting LEDs and the voltage values are detected.

FIG. 15B shows the number of lighting LEDs and the voltage value detected at the post-lighting timing of AT1 to AT12. As shown in the figure, at the post-lighting timing of AT3, the number of lighting LEDs according to the lighting schedule is 10, while the number of actual lighting LEDs is 11, so that the number of lighting LEDs according to the lighting schedule does not match the number of actual lighting LEDs.

Actually, however, there is a variation in the resistance value R of the LEDs. Therefore, if the number of lighting LEDs increases, a variation in the voltage value applied to the LED array 10 also increases, resulting in a possibility that the number of actual lighting LEDs may be erroneously estimated.

For example, if a voltage value is detected at a timing at which ten LEDs are turned on, such as the post-lighting timings of AT2 and AT3, if those LEDs happen to be LEDs having a large resistance value, the number of actual lighting LEDs is estimated to be larger, resulting in a possibility of erroneously detecting that there is a disconnection while there is actually no disconnection. On the contrary, if those LEDs happen to be LEDs having a large resistance value, the number of actual lighting LEDs is estimated to be smaller, resulting in a possibility of erroneously detecting that there is no disconnection although there is actually a disconnection. This makes it difficult to correctly detect whether there is a disconnection at a timing when the number of lighting LEDs is large.

Therefore, in the vehicle front lighting apparatus 150 according to the second embodiment, attention is paid not to the number of lighting LEDs and the number of actual lighting LEDs at the post-lighting timing of AT, but to the amount of change in the number of lighting LEDs and the number of actual lighting LEDs. In other words, when the number of lighting LEDs and the number of actual lighting LEDs are detected at a certain post-lighting timing AT, the number of lighting LEDs and the number of actual lighting LEDs are compared with the number of lighting LEDs and the number of actual lighting LEDs detected before the post-lighting timing AT, and the amount of change in the number of lighting LEDs and the amount of change in the number of actual lighting LEDs are calculated.

FIG. 15C shows the amount of change in the number of lighting LEDs and the amount of change in the number of actual lighting LEDs obtained in this manner. For example, the amount of change in the number of lighting LEDs and the number of actual lighting LEDs match each other as "+1" between the timing of AT1 and the timing of AT2, but the amount of change in the number of lighting LEDs and the amount of change in the number of actual lighting LEDs do not match each other between the timing of AT2 and the timing of AT3. In the same manner, the amount of change in the number of lighting LEDs and the amount of change in the number of actual lighting LEDs do not match each other between the timing of AT3 and the timing of AT4, between the timing of AT8 and the timing of AT9, and between the timing of AT11 and the timing of AT12. The mismatch in the amount of change occurs because, as shown in FIG. 15B, portions in which the number of lighting LEDs and the number of actual lighting LEDs are different from each other occur. Therefore, instead of detecting the number of lighting LEDs and the number of actual lighting LEDs to determine whether those numbers match each other, it may be determined whether the amount of change in the number of lighting LEDs and the amount of change in the number of actual lighting LEDs match each other, or mismatch each other.

As is clear from a comparison between FIG. 15B and FIG. 15C, since the amount of change in the number of actual lighting LEDs becomes smaller than the amount of change in the number of actual lighting LEDs, a variation in the resistance value of the LEDs is less likely to be affected. For example, it is assumed that the resistance value of the LEDs varies by about ±10% of the design resistance value. At this time, if 10 lighting LEDs shown in FIG. 15B happen to be LEDs having a large resistance value, there is a possibility that the number of actual lighting LEDs is erroneously detected as 11. On the other hand, as shown in FIG. 15C, in the case of the amount of change in the number of actual lighting LEDs, "−3" is not erroneously detected as "−2" or "−4". As described above, if attention is paid to the amount of change in the number of lighting LEDs to be turned on and the amount of change in the number of actual lighting LEDs actually turned on, even if a voltage value is detected at a timing when the number of lighting LEDs is large, it can be reliably detected whether there is a disconnection.

Figure 16:
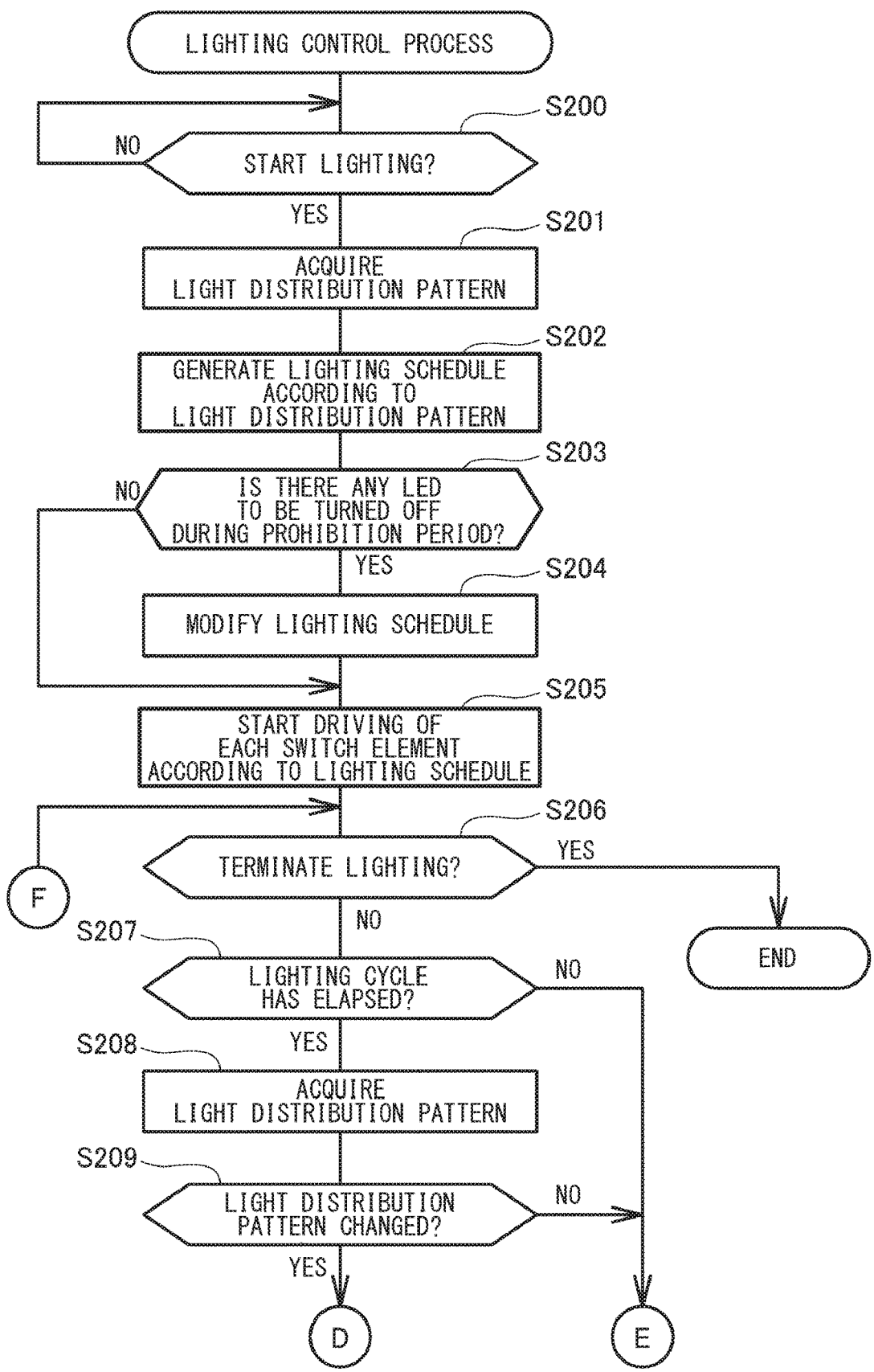
FIG. 16 is a flowchart showing a first half of a lighting control process executed by the vehicle front lighting apparatus according to the second embodiment.
Figure 17:
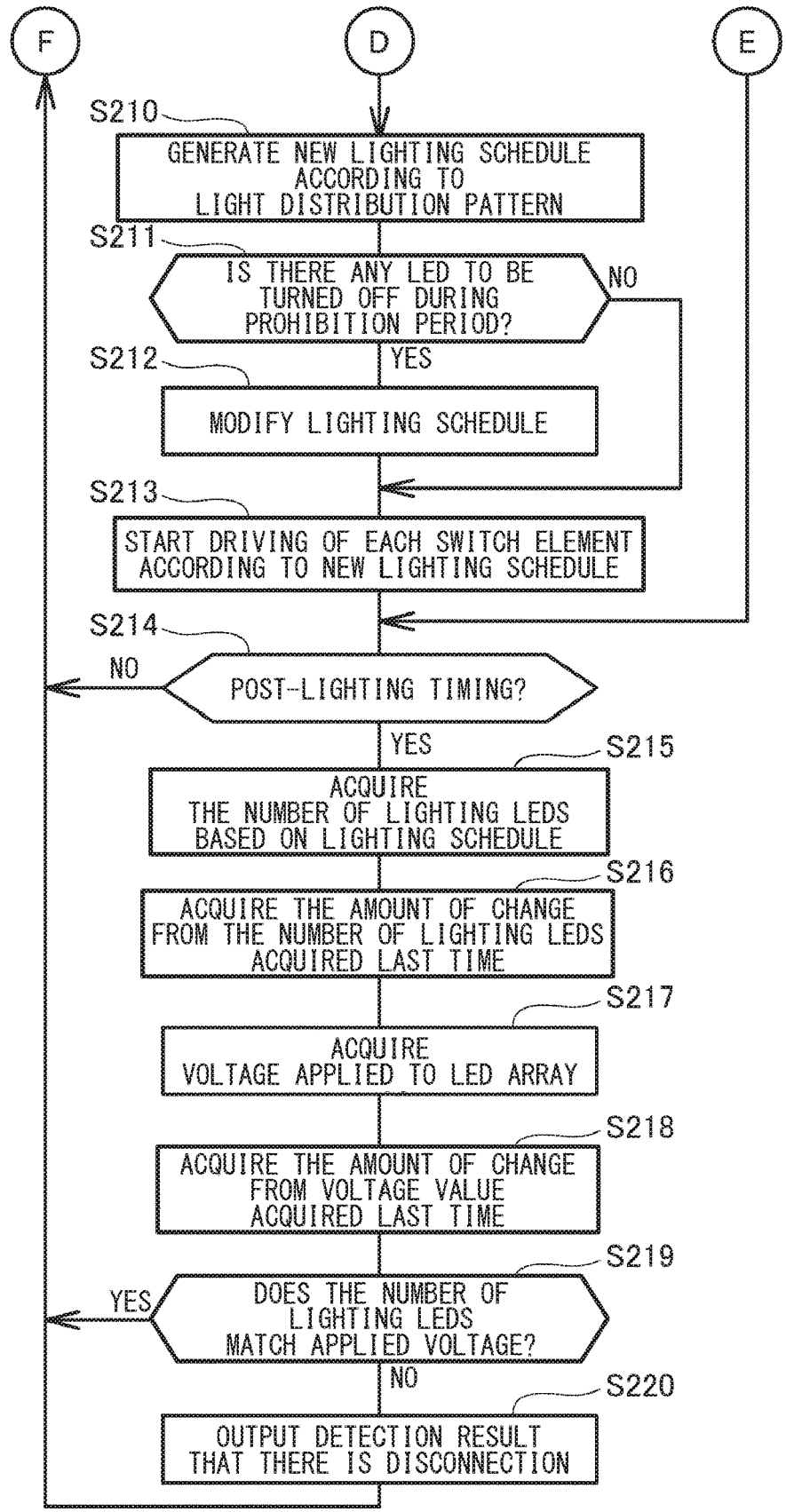
FIG. 17 is a flowchart showing a second half of the lighting control process executed by the vehicle front lighting apparatus according to the second embodiment.

FIGS. 16 and 17 show flowcharts of a lighting control process to be executed by the vehicle front lighting apparatus 150 according to the second embodiment to illuminate a region in front of the vehicle 1 by use of the LED array 10. The lighting control process according to the second embodiment differs from the lighting control process according to the first embodiment described above with reference to FIGS. 12 and 13 in that whether there is a disconnection is determined based on the amount of change in the number of lighting LEDs and the voltage value, but the other portions are the same. Therefore, the lighting control process according to the second embodiment will be described below focusing on the difference from the first embodiment.

As shown in the figure, even in the lighting control process according to the second embodiment, as in the lighting control process according to the first embodiment described above, first, it is determined whether lighting is to be started by use of the LED array 10 (S200). As a result, when the lighting is not started (NO in S200), the lighting control process is in a waiting state while repeating the same determination until the instruction to start the lighting is received.

When it is determined that lighting is to be started (YES in S200), the light distribution pattern is acquired from the lamp ECU 50 (S201), and a lighting schedule corresponding to the light distribution pattern is generated (S202).

Next, it is determined whether there are LEDs scheduled to be turned off during a prohibition period of the generated lighting schedule (S203). As described above, the prohibition period is a period from the lighting timing to the post-lighting timing after the change time CT has elapsed. Then, when there is an LED to be turned off during the prohibition period (YES in S203), the lighting schedule is modified by changing the timing of turning off the LED scheduled to be turned off during the prohibition period as described above with reference to FIGS. 11A and 11B (S204). On the other hand, if there is no LED to be turned off during the prohibition period (NO in S203), the lighting schedule is not modified.

Subsequently, driving of the switch elements SWs corresponding to the respective LEDs is started in accordance with the lighting schedule (S205). After it is determined whether the lighting is to be terminated (S206), if the lighting is not to be terminated (NO in S206), it is determined whether the lighting cycle has elapsed (S207). As a result, when the lighting cycle has not yet elapsed (NO in S207), it is determined whether the post-lighting timing of any of AT1 to AT12 has come (S214 in FIG. 17).

As a result, when the present timing is not the post-lighting timing (NO in S214 of FIG. 13), the flow returns to S206 in FIG. 16, and it is determined whether the lighting is to be terminated. As a result, when the lighting is not finished (NO in S206), it is determined whether the lighting cycle has elapsed (S207), and when the lighting cycle has not elapsed (NO in S207), it is determined whether the post-lighting timing, which is the timing for detecting disconnection, has come (S214 in FIG. 17).

While the above operations are repeated, the switch elements SW1 to SW12 are driven according to the lighting schedule.

As a result, it is determined that the present timing has come to the post-lighting timing (YES in S214 of FIG. 17), so that the number of lighting LEDs is acquired (S215). Next, in the lighting control process according to the second embodiment, the amount of change from the number of lighting LEDs obtained at the previous post-lighting timing (S216).

In this manner, when the amount of change in the number of lighting LEDs is obtained, the voltage value applied to the LED array 10 is obtained (S217). Then, the amount of change from the voltage value acquired at the previous post-lighting timing is acquired (S218).

Then, in the lighting control process according to the second embodiment, it is determined whether the amount of change in the number of lighting LEDs acquired in S216 matches the amount of change in the voltage value acquired in S218 (S219). In other words, if the amount of change in the number of lighting LEDs acquired in S216 is dN, the average resistance value of the LEDs is R, a variation of the resistance value is dR, and a target current value flowing through the LEDs is I, the amount of change in the voltage value dV applied to the LED arrays 10 should fall within the following range.

$$dN \cdot (R-dR) \cdot I < dV < dN \cdot (R+dR) \cdot I \tag{3}$$

Therefore, when the amount of change in the voltage value acquired in S218 falls within a range satisfying Expression (3), it is determined that the amount of change in the number of lighting LEDs matches the amount of change in the voltage value (YES in S219), and when the amount of change in the number of lighting LEDs does not fall within the range satisfying Expression (3), it is determined that the amount of change in the number of lighting LEDs does not match the amount of change in the voltage value (NO in S219).

As a result, when it is determined that the amount of change in the number of lighting LEDs and the amount of change in the voltage value do not match each other (NO in S219), the detection result that "there is a disconnection" is output to the outside (for example, the lamp ECU 50 in FIG. 1B) (S220), the flow returns to S204 in FIG. 16, and it is determined whether to terminate the lighting.

On the other hand, when it is determined that the amount of change in the number of lighting LEDs and the amount of change in the voltage value match each other (YES in S219), the flow returns to S204 in FIG. 16 as it is without outputting the detection result, and it is determined whether the lighting is to be terminated.

As described above, in the lighting control process according to the second embodiment, when the driving of the switch elements SWs is started according to the lighting schedule corresponding to the light distribution pattern (S205), whether there is a disconnection is detected by repeating the operation described above (S219 and S220 in FIG. 17).

When the lighting cycle has elapsed while repeating the above operation (YES in S207 of FIG. 16), the light distribution pattern is acquired from the lamp ECU 50 (S208).

Then, it is determined whether the newly acquired light distribution pattern has been changed from the previously acquired light distribution pattern (S209), and when there is no change in the light distribution pattern (NO in S209), the series of processes (S210 to S220 in FIG. 17) described above is repeated until the lighting cycle has elapsed and a determination of "YES" is made in S207.

On the other hand, when the newly acquired light distribution pattern is changed from the previously acquired light distribution pattern (YES in S209), a new lighting schedule corresponding to the new light distribution pattern is generated (S210 in FIG. 17). Subsequently, it is determined whether there is an LED scheduled to be turned off during the prohibition period of the newly generated lighting schedule (S211), and when there is an LED (YES in S211), the lighting schedule is modified by changing the timing at which the LED is turned off (S212). If there is no LED to be turned off during the prohibition period (NO in S211), the lighting schedule is not modified.

After the driving of the switch elements SW is started according to the new lighting schedule (S213), it is determined whether the post-lighting timing, which is the timing for detecting a disconnection, has come (S214). As a result, when the post-lighting timing has not come (NO in S214), the flow returns to S206 in FIG. 16, and it is determined whether the lighting is to be terminated. On the other hand, when the present timing becomes the post-lighting timing (YES in S214), the number of lighting LEDs is acquired based on the lighting schedule (S215), and then the series of operations (S216 to S220) described above is performed. The above operation is repeated until the lighting is terminated.

When it is finally determined that the lighting is to be terminated (YES in S206 of FIG. 16), the lighting control process according to the second embodiment shown in FIGS. 16 and 17 is terminated.

In the second embodiment described above, it can be easily and quickly detected whether there is a disconnection, by determining whether the amount of change in the number of lighting LEDs to be turned on in the LED array 10 matches the amount of change in the voltage value to be applied to the LED array 10.

In addition, unlike the number of lighting LEDs, the amount of change in the number of lighting LEDs does not become a large value, so that there is no risk that whether there is a disconnection is erroneously detected due to the influence of the variation in the resistance value R of the LEDs.

In addition, since the lighting schedule is modified so that there is no LED to be turned off in the prohibited period (that is, a period from the lighting timing to the post-lighting timing), the voltage value in the course of the change is detected, and there is no risk that whether there is a disconnection is erroneously detected.

Third Embodiment

In the second embodiment described above, every time the change time CT elapses from the lighting timing to the post-lighting timing, the number of lighting LEDs and the voltage value are detected, and the amount of change in the number of lighting LEDs and the voltage value are acquired. When there are multiple LEDs to be turned off between the post-lighting timing and a next post-lighting timing, the amount of change in the number of lighting LEDs is multiple, and the amount of change in the voltage value is also increased accordingly.

On the other hand, the voltage value may be detected at a timing before and after the lighting timing to acquire the amount of change in the voltage value. With the above configuration, the obtained amount of change in the voltage value is an amount of increase in the voltage value caused by turning on one LED in the lighting timing. Therefore, if the amount of change in the voltage value obtained before and after the lighting timing matches the amount of change in the voltage value corresponding to one LED, it can be determined that no disconnection occurs, and conversely, if not match, it can be determined that a disconnection occurs.

Figure 18:
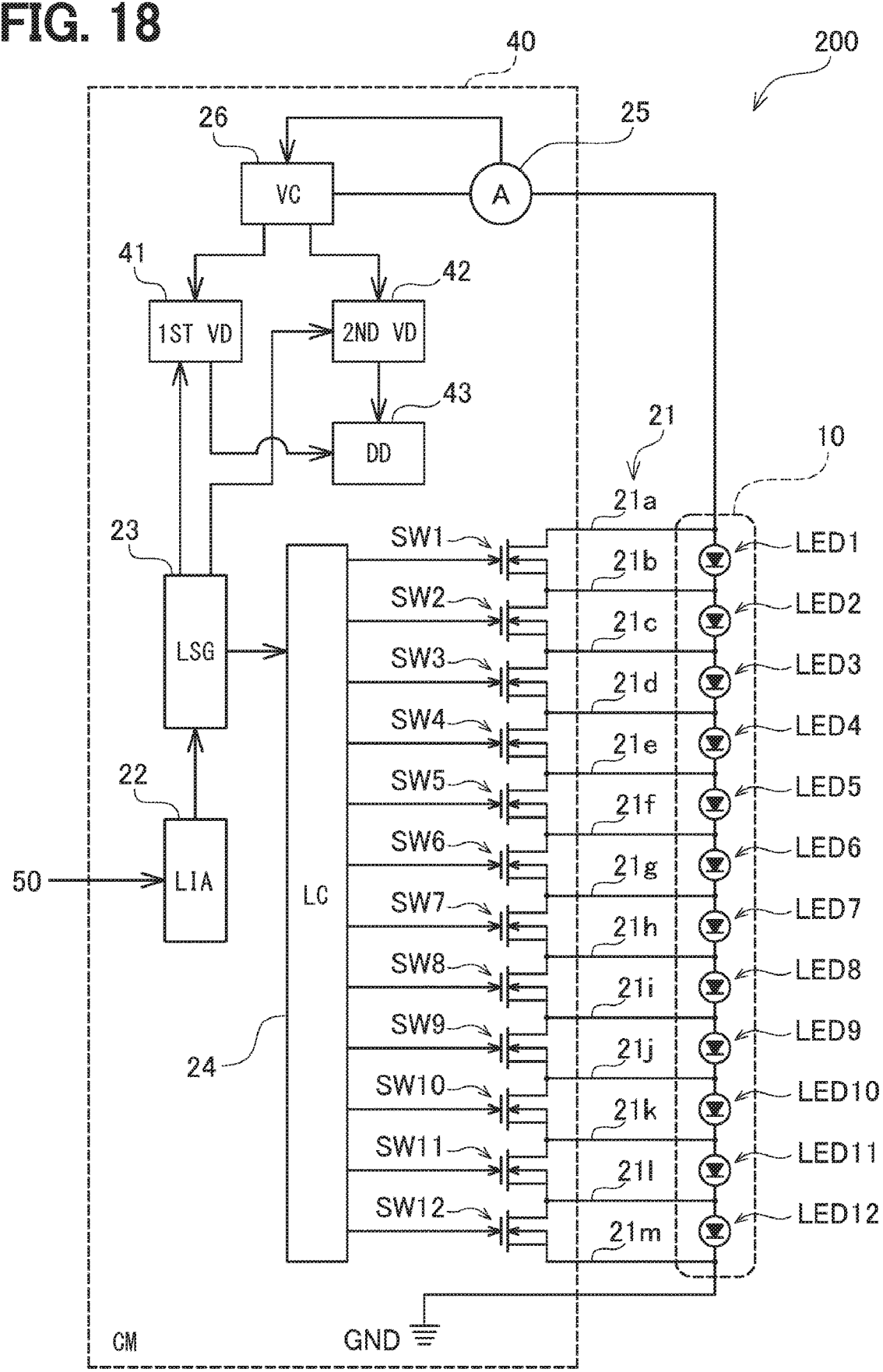
FIG. 18 is a block diagram showing an internal structure of a vehicle front lighting apparatus according to a third embodiment.

FIG. 18 shows a rough internal structure of the vehicle front lighting apparatus 200 according to the third embodiment described above. As shown in the figure, in the vehicle front lighting apparatus 200 according to the third embodiment, the control module 30 is changed to a control module 40 as compared with the vehicle front lighting apparatus 150 according to the second embodiment described above with reference to FIG. 14. The control module 40 according to the third embodiment is different from the control module 30 according to the second embodiment in that a first voltage value detection unit 41, a second voltage value detection unit 42, and a disconnection determination unit 43 are provided instead of the detection unit 27, the change amount acquisition unit 31, and the disconnection determination unit 32. Similarly to the lighting schedule generation unit 23 according to the first embodiment and the second embodiment described above, when there is an LED scheduled to be turned off during a prohibition period, a lighting schedule generation unit 23 according to the third embodiment changes a timing at which the LED is turned off to outside the prohibition period, but the prohibition period of the third embodiment is different from the prohibition periods of the first embodiment and the second embodiment. However, the other portions are the same as those of the control module 20 according to the first embodiment or the control module 30 according to the second embodiment.

As shown in FIG. 18, the control module (CM) 40 according to the third embodiment includes, in addition to switch elements SW1 to SW12, a lighting intensity acquisition unit (LIA) 22, a lighting schedule generation unit (LSG) 23, a lighting control unit (LC) 24, a current value detection unit 25, a voltage value control unit (VC) 26, the first voltage value detection unit (1ST VD) 41, the second voltage value detection unit (2ND VD) 42, and the disconnection determination unit (DD) 43. Among those components, the switch elements SW1 to SW12, the lighting intensity acquisition unit 22, the lighting control unit 24, the current value detection unit 25, and the voltage value control unit 26 are the same as those in the first embodiment or the second embodiment, and therefore a description of those same components will be omitted. The first voltage value detection unit 41 corresponds to a "first voltage value detector" in the present disclosure, the second voltage value detection unit 42 corresponds to a "second voltage value detector" in the present disclosure, and the disconnection determination unit 43 corresponds to a "disconnection determiner" in the present disclosure.

The first voltage value detection unit 41 detects a voltage value applied to an LED array 10 at a post-lighting timing in which a change time CT has elapsed from a timing at which any one of the LEDs is turned on (that is, a lighting timing). The first voltage value detection unit 41 according to the third embodiment detects the voltage value, but does not detect the number of lighting LEDs. The timing of detecting the voltage value is acquired based on a lighting schedule generated by the lighting schedule generation unit 23.

The second voltage value detection unit 42 detects the voltage value applied to the LED array 10 at the pre-lighting timing set prior to the lighting timing. The second voltage value detection unit 42 also detects the voltage value, but does not detect the number of lighting LEDs. The timing of detecting the voltage value is acquired based on a lighting schedule generated by the lighting schedule generation unit 23.

In addition, the lighting schedule generation unit 23 generates a lighting schedule representing timings at which the LED 1 to the LED 12 are turned on and off based on the lighting intensity of the LED 1 to the LED 12 acquired from the lighting intensity acquisition unit 22. If there is an LED scheduled to be turned off during a prohibition period as a result of generating the lighting schedule, a timing of turning off the LED is changed to be outside the prohibition period. The prohibition period according to the third embodiment is different from the prohibition periods of the first embodiment and the second embodiment, and this difference will be described later.

The disconnection determination unit 43 determines whether the amount of change from the voltage value before lighting detected by the second voltage value detection unit 42 to the voltage value after lighting detected by the first voltage value detection unit 41 matches the amount of change in the voltage value caused by incrementing the lighting LED by one.

In this example, the timings at which the first voltage value detection unit 41 and the second voltage value detection unit 42 according to the third embodiment detect the voltage values are set as follows.

Figure 19A:
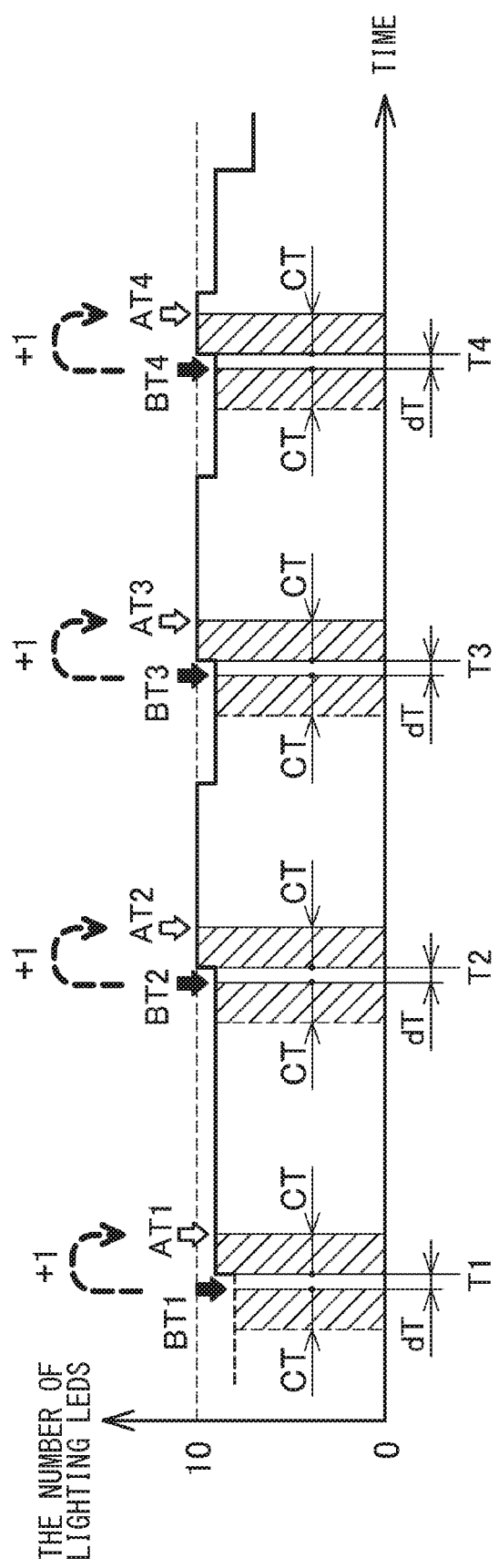
FIG. 19A is an illustrative diagram of a pre-lighting timing, a post-lighting timing, and a prohibition period set in the third embodiment.

FIG. 19A shows a timing at which the voltage value is detected by enlarging portions before and after lighting timings of T1 to T4. As described above, T1 is a timing at which the LED 1 is turned on, and T2 to T4 are timings at which the LED 2 to the LED 4 are turned on. In the case of the third embodiment, similarly to the first embodiment and the second embodiment described above, the post-lighting timing is set to a timing at which a change time CT has elapsed from the lighting timing. In this example, the change time CT is a time in which the voltage value may be considered to be stable to a new voltage value with a margin after the number of lighting LEDs has changed. Post-lighting timings after of AT1 to AT4 are set to the lighting timings of T1 to T4.

In the third embodiment, the voltage value is detected both before the lighting timing and at the pre-lighting timing, and the pre-lighting timing is set to a timing before a margin time dT from the lighting timing. The margin time dT is a time set to avoid a situation in which the voltage value changes at the lighting timing during the detection of the voltage value, and is slightly longer than the change time CT. As shown in FIG. 19A, the pre-lighting timings of BT1 to BT4 are set for the lighting timings of T1 to T4. Though not shown, pre-lighting timings of BT5 to BT12 are also set for lighting timing of T5 to T12.

The change time CT can also be considered for those pre-lighting timings. In other words, it is assumed that there is an LED which is turned off at a timing before the pre-lighting timing, and a time from the turning off of the LED to the pre-lighting timing is shorter than the change time CT. Then, there is a possibility that the voltage value detected at the pre-lighting timing becomes a voltage value in the course of decreasing as the LED is turned off, and as a result of detecting a voltage value higher than the actual value, there is a possibility of erroneously detecting that the wiring is disconnected. In order to avoid the above situation, a prohibition period of the change time CT during which the LED should not be turned off may be provided also before the pre-lighting timing.

Therefore, in the third embodiment, a period from the timing before the change time CT from the pre-lighting timing to the post-lighting timing becomes the prohibition period. Then, after generating the lighting schedule, it is confirmed whether there is an LED which is to be turned off during the prohibition period described above, and when there is the above LED, a timing at which the LED is turned off is moved so as to fall outside the prohibition period.

Figure 19B:
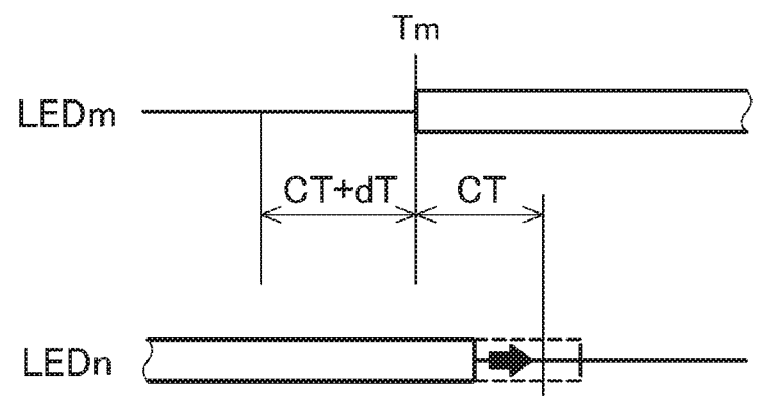
FIG. 19B is an illustrative diagram illustrating a state in which the vehicle front lighting apparatus moves the timing at which the LEDs are turned off according to the third embodiment.
Figure 19C:
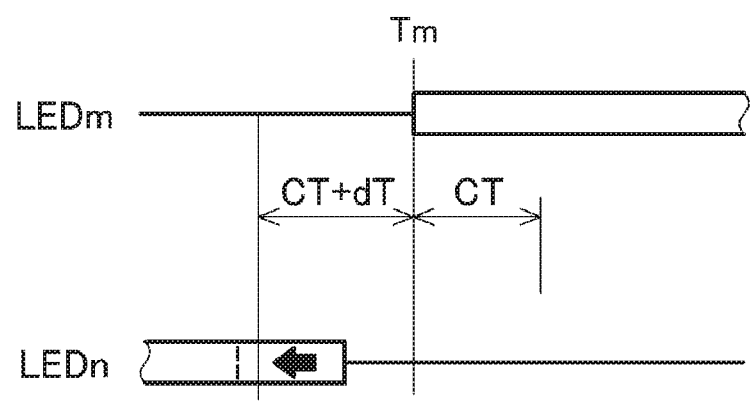
FIG. 19C is an illustrative diagram illustrating a state in which the vehicle front lighting apparatus moves the timing at which the LEDs are turned off according to the third embodiment.

When a timing at which the LED is turned off is moved, the timing can be moved in a direction in which the amount of movement is small. For example, as shown in FIG. 19B, when there is an LED scheduled to be turned off in a second half of the prohibition period, the timing at which the LED is turned off is moved to a rear side as indicated by a black arrow in the drawing, and is changed to a timing indicated by a dashed line. For example, as shown in FIG. 19C, when there is an LED scheduled to be turned off in a first half of the prohibition period, the timing at which the LED is turned off is moved to a front side as indicated by a black arrow in the drawing, and is changed to a timing indicated by a dashed line.

With the above configuration, the LED 1 is turned on at the lighting time of T1, but the other LEDs are not turned on or off at least during the prohibition period. Therefore, if the voltage value is detected at the pre-lighting timing and the post-lighting timing before and after the lighting timing of T1, the change in the voltage value caused by turning on the LED 1 can be correctly detected, and therefore whether there is a disconnection can be correctly detected. In addition, the reason why a disconnection can be detected at the time of turning on the LED 1 is because any one of the bypass wirings drawn from an upstream side and a downstream side of the LED 1 is disconnected, and therefore if it is known that the disconnection is detected when which of the LEDs is turned on, a position at which the disconnection occurs can also be specified.

Figure 20:
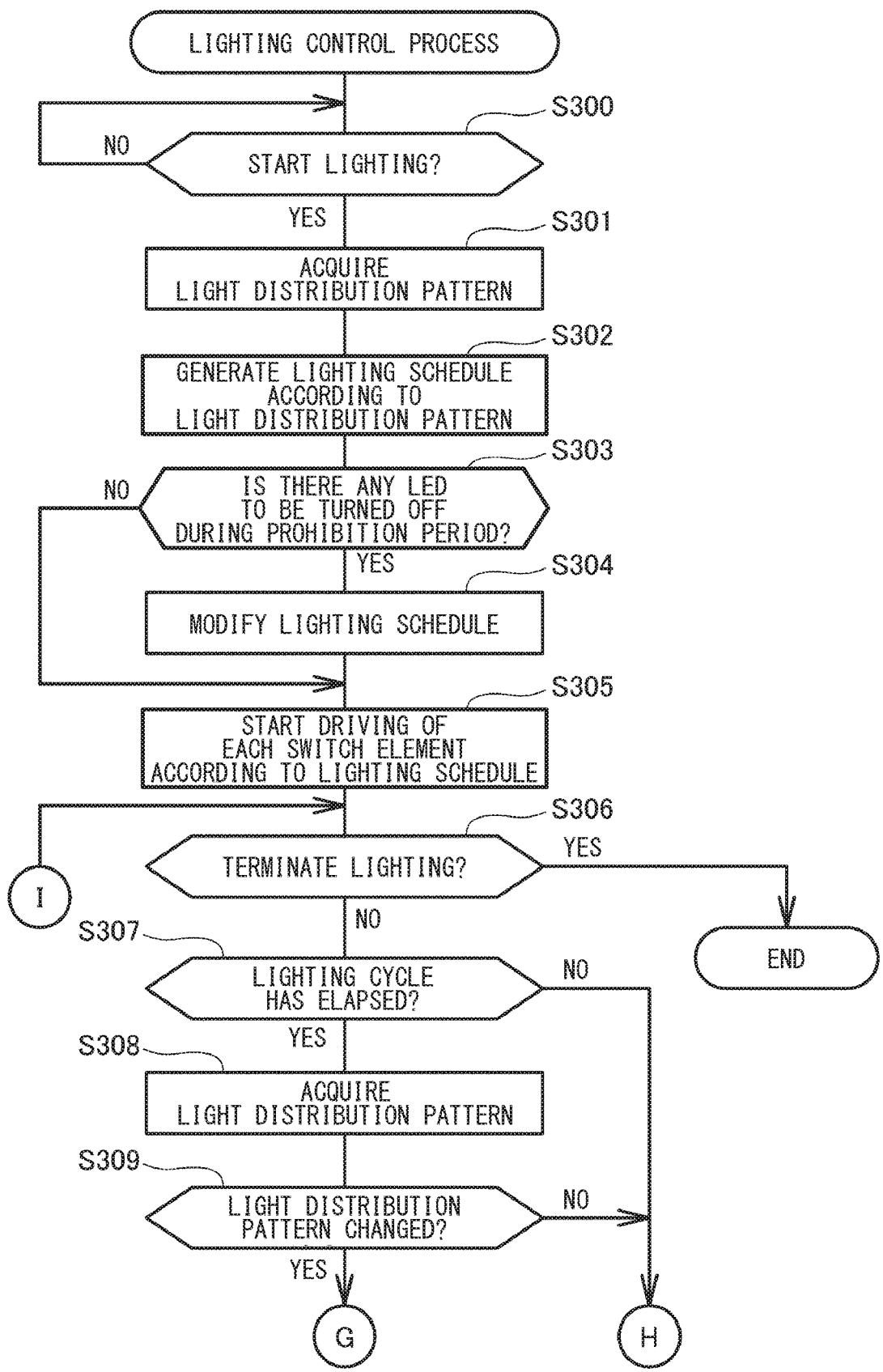
FIG. 20 is a flowchart showing a first half of a lighting control process executed by the vehicle front lighting apparatus according to the third embodiment.
Figure 21:
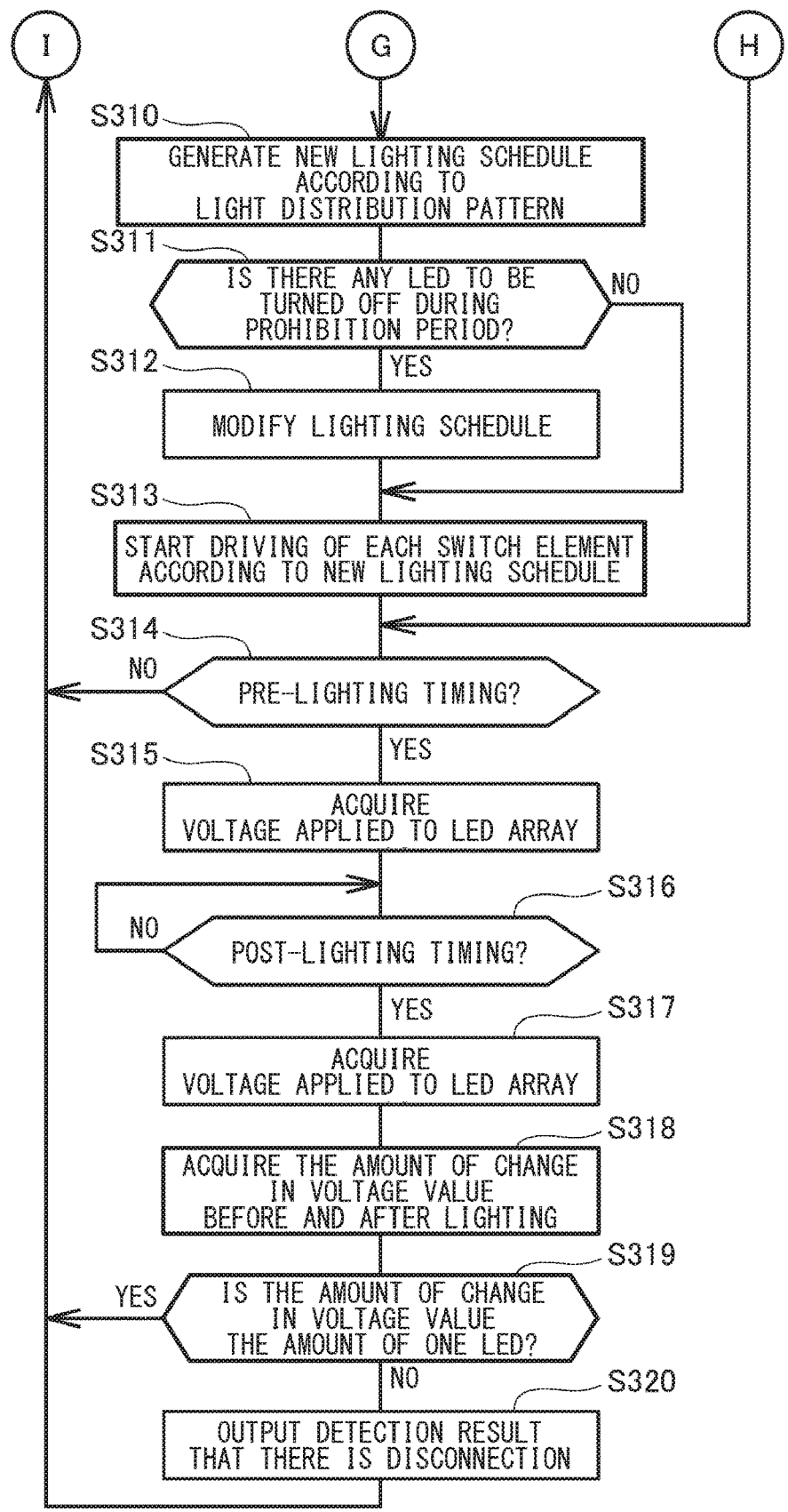
FIG. 21 is a flowchart showing a second half of the lighting control process executed by the vehicle front lighting apparatus according to the third embodiment.

FIGS. 20 and 21 show flowcharts of a lighting control process to be executed by the vehicle front lighting apparatus 200 according to the third embodiment to illuminate a region in front of the vehicle 1 by use of the LED array 10. The lighting control process according to the third embodiment differs from the lighting control process according to the second embodiment described above with reference to FIGS. 16 and 17 in that the voltage value is detected before and after the lighting timing, and whether there is a disconnection is determined based on whether the amount of change in the voltage value before and after the lighting timing corresponds to the amount of change in the voltage value for one LED, but the other portions are the same. Therefore, the lighting control process according to the third embodiment will be described below focusing on the difference from the second embodiment.

As illustrated, even in the lighting control process according to the third embodiment, similarly to the lighting control process according to the second embodiment described above, first, it is determined whether to start the lighting by use of the LED array 10 (S300), if the lighting does not start (NO in S300), the lighting control process becomes in a waiting state while repeating the same determination until an instruction to start the lighting is received. When it is determined that lighting is to be started (YES in S300), the light distribution pattern is acquired from the lamp ECU 50 (S301), and a lighting schedule corresponding to the light distribution pattern is generated (S302).

Next, it is determined whether there is an LED scheduled to be turned off during a prohibition period of the generated lighting schedule (S303). As described above with reference to FIG. 19A, the prohibition period according to the third embodiment is set to a period from a timing that is prior to the lighting timing by a time obtained by adding a margin time dT to a change time CT to the post-lighting timing. When there is an LED to be turned off during the prohibition period (YES in S303), the lighting schedule is modified by changing the timing at which the LED scheduled to be turned off during the prohibition period is turned off (S304). On the other hand, if there is no LED to be turned off during the prohibition period (NO in S303), the lighting schedule is not modified.

Subsequently, driving of the switch elements SWs corresponding to the respective LEDs is started in accordance with the lighting schedule (S305). After it is determined whether the lighting is to be terminated (S306), if the lighting is not to be terminated (NO in S306), it is determined whether the lighting cycle has elapsed (S307). As a result, when the lighting cycle has not elapsed (NO in S307), it is determined whether the pre-lighting timing has come (S314 in FIG. 21). The pre-lighting timing is set to the timings of BT1 to BT12 prior to the margin time dT from the lighting timings of T1 to T12.

As a result, when the pre-lighting timing has not come (NO in S314), the flow returns to S306 in FIG. 20, and it is determined the series of operations described above is repeated. While those operations are repeated, it is determined that the pre-lighting timing has come (YES in S314), so that the voltage value applied to the LED array 10 is detected (S315), and it is then determined whether the post-lighting timing has come (S316). As a result, even when the post-lighting timing has not come (NO in S316), since the post-lighting timing has come when the margin time dT and the change time CT have elapsed from the pre-lighting timing, the lighting control process becomes in a waiting state until the post-lighting timing comes to by repeating the determination in S316. When the post-lighting timing has come (YES in S316), the voltage value applied to the LED array 10 is again detected (S317).

Then, the amount of change in the voltage value to the voltage value detected at the post-lighting timing from the voltage value detected at the pre-lighting timing is acquired (S318), and it is determined whether the amount of change in the voltage value corresponds to one LED (S319). In other words, if an average resistance value of the LEDs is R, a variation of the resistance values is dR, and a target current value flowing through the LEDs is I, it is determined whether the amount of change in the voltage value dV falls within a range of:

$$(R-dR) \cdot I < dV < (R+dR) \cdot I \qquad (4)$$

Therefore, when the amount of change in the voltage value acquired in S218 falls within a range satisfying Expression (4), it is determined that the amount of change in the number of lighting LEDs matches the amount of change in the voltage value (YES in S219), and when the amount of change in the number of lighting LEDs does not fall within the range satisfying Expression (4), it is determined that the amount of change in the number of lighting LEDs does not match the amount of change in the voltage value (NO in S219).

As a result, when the amount of change in the voltage value does not fall within the range satisfying Expression (4) (NO in S319), after the detection result that "there is a disconnection" is output to the outside (for example, the lamp ECU 50 in FIG. 1B) (S320), the flow returns to S304 in FIG. 20, and it is determined whether the lighting is to be terminated.

On the other hand, when the amount of change in the voltage value falls within the range satisfying Expression (4) (YES in S319), the flow returns to S304 in FIG. 20 as it is without outputting the detection result particularly, and it is determined whether the lighting is to be terminated.

As described above, even in the lighting control process according to the third embodiment, when the driving of the switch elements SWs is started according to the lighting schedule corresponding to the light distribution pattern (S305), whether there is a disconnection is detected by repeating the operation described above (S319 and S320 in FIG. 21).

When the lighting cycle has elapsed while repeating the above operation (YES in S307 of FIG. 20), the light distribution pattern is acquired from the lamp ECU 50 (S308).

Then, it is determined whether the newly acquired light distribution pattern has been changed from the previously acquired light distribution pattern (S309), and when there is no change in the light distribution pattern (NO in S309), the series of processes (S310 to S320 in FIG. 21) described above is repeated until the lighting cycle has elapsed and a determination of "YES" is made in S307.

On the other hand, when the newly acquired light distribution pattern is changed from the previously acquired light distribution pattern (YES in S309), a new lighting schedule corresponding to the new light distribution pattern is generated (S310 in FIG. 21). Subsequently, it is determined whether there is an LED scheduled to be turned off during the prohibition period of the newly generated lighting schedule (S311), and when there is an LED (YES in S311), the lighting schedule is modified by changing the timing at which the LED is turned off (S312). If there is no LED to be turned off during the prohibition period (NO in S311), the lighting schedule is not modified.

After the driving of the switch elements SW is started according to the new lighting schedule (S313), it is determined whether the post-lighting timing, which is the timing for detecting a disconnection, has come (S314). As a result, when the post-lighting timing has not come (NO in 314), the flow returns to S306 in FIG. 20, and it is determined whether the lighting is to be terminated. On the other hand, when the present timing becomes the post-lighting timing (YES in S314), the number of lighting LEDs is acquired based on the lighting schedule (S315), and then the series of operations (S316 to S320) described above is performed. The above operation is repeated until the lighting is terminated.

When it is finally determined that the lighting is to be terminated (YES in S306 of FIG. 20), the lighting control process according to the third embodiment shown in FIGS. 20 and 21 is terminated.

In the third embodiment described above, the voltage value applied to the LED array 10 before and after the lighting timing is detected, and it is determined whether the amount of change in the voltage value corresponds to one LED, thereby being capable of easily and quickly detecting whether there is a disconnection.

In addition, since the lighting schedule is modified so that there is no LED to be turned off during the prohibition period, there is no case in which a voltage value in the course of a change is detected, and whether there is a disconnection is erroneously detected.

Further, in the third embodiment, since a change in the voltage value caused by the individual lighting of the LED 1 to LED 12 can be detected, a position at which the disconnection occurs can be also specified.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle front lighting apparatus for illuminating a region in front of a vehicle by use of a plurality of lighting devices in a shared manner, the vehicle front lighting apparatus comprising:
a lighting device array in which the lighting devices are connected in series;
a plurality of bypass circuits respectively provided for the lighting devices and allowing a current flowing through the lighting devices to bypass the lighting devices;
a plurality of switch elements respectively provided for the bypass circuits for opening and closing the bypass circuits;
a lighting intensity detector configured to acquire information on a lighting intensity of each of the lighting devices of the lighting device array;
a lighting schedule generator configured to generate, upon acquiring the information on the lighting intensity, a lighting schedule for turning on the lighting devices at timings different from each other, and turning off the lighting devices at timings respectively corresponding to the lighting intensities of the lighting devices;
a lighting controller configured to repeat, upon receiving the lighting schedule, an operation of bringing the switch element of the lighting device to be turned on into an opened state and bringing the switch element of the lighting device to be turned off into a closed state in a predetermined lighting cycle according to the lighting schedule;
a current value detector configured to detect a current value flowing through the lighting device array;
a voltage value controller configured to apply a voltage to the lighting device array, and to change the voltage value to be applied to cause the current value flowing through the lighting device array reaches a predetermined target current value;
a detector configured to detect the number of switch elements brought into the closed state and the voltage value applied to the lighting device array at a post-lighting timing at which a predetermined change time longer than a time required for the voltage value controller to change the voltage value has elapsed from a lighting timing at which any of the switch elements is brought into the opened state; and
a disconnection determiner configured to determine whether the number of switch elements detected at the post-lighting timing matches the voltage value, and to determine that a disconnection has occurred in any of the bypass circuits if not match, wherein
when there is the switch element to be brought into the closed state during a prohibition period from the lighting timing to the post-lighting timing, the lighting schedule generator changes a timing at which the switch element is brought into the closed state outside the prohibition period.

2. A vehicle front lighting apparatus for illuminating a region in front of a vehicle by use of a plurality of lighting devices in a shared manner, the vehicle front lighting apparatus comprising:
a lighting device array in which the lighting devices are connected in series;
a plurality of bypass circuits respectively provided for the lighting devices and allowing a current flowing through the lighting devices to bypass the lighting devices;

a plurality of switch elements respectively provided for the bypass circuits for opening and closing the bypass circuits;

a lighting intensity detector configured to acquire information on a lighting intensity of each of the lighting devices of the lighting device array;

a lighting schedule generator configured to generate, upon acquiring the information on the lighting intensity, a lighting schedule for turning on the lighting devices at timings different from each other, and turning off the lighting devices at timings respectively corresponding to the lighting intensities of the lighting devices;

a lighting controller configured to repeat, upon receiving the lighting schedule, an operation of bringing the switch element of the lighting device to be turned on into an opened state and bringing the switch element of the lighting device to be turned off into a closed state in a predetermined lighting cycle according to the lighting schedule;

a current value detector configured to detect a current value flowing through the lighting device array;

a voltage value controller configured to apply a voltage to the lighting device array, and to change the voltage value to be applied to cause the current value flowing through the lighting device array reaches a predetermined target current value;

a detector configured to detect the number of switch elements brought into the closed state and the voltage value applied to the lighting device array at a post-lighting timing at which a predetermined change time longer than a time required for the voltage value controller to change the voltage value has elapsed from a lighting timing at which any of the switch elements is brought into the opened state;

a change amount detector configured to acquire, upon detection of the number of switch elements and the voltage value at the post-lighting timing, the amounts of change from the number of switch elements and the voltage value detected at a previous post-lighting timing; and a disconnection determiner configured to determine whether the amount of change in the number of switch elements matches the amount of change in the voltage value, and to determine that a disconnection has occurred in any of the bypass circuits if not match, wherein when there is the switch element to be brought into the closed state during a prohibition period from the lighting timing to the post-lighting timing, the lighting schedule generator changes a timing at which the switch element is brought into the closed state outside the prohibition period.

3. A vehicle front lighting apparatus for illuminating a region in front of a vehicle by use of a plurality of lighting devices in a shared manner, the vehicle front lighting apparatus comprising:

a lighting device array in which the lighting devices are connected in series;

a plurality of bypass circuits respectively provided for the lighting devices and allowing a current flowing through the lighting devices to bypass the lighting devices;

a plurality of switch elements respectively provided for the bypass circuits for opening and closing the bypass circuits;

a lighting intensity detector configured to acquire information on a lighting intensity of each of the lighting devices of the lighting device array;

a lighting schedule generator configured to generate, upon acquiring the information on the lighting intensity, a lighting schedule for turning on the lighting devices at timings different from each other, and turning off the lighting devices at timings respectively corresponding to the lighting intensities of the lighting devices;

a lighting controller configured to repeat, upon receiving the lighting schedule, an operation of bringing the switch element of the lighting device to be turned on into an opened state and bringing the switch element of the lighting device to be turned off into a closed state in a predetermined lighting cycle according to the lighting schedule;

a current value detector configured to detect a current value flowing through the lighting device array;

a voltage value controller configured to apply a voltage to the lighting device array, and to control the voltage value to be applied to cause the current value flowing through the lighting device array reaches a predetermined target current value;

a first voltage value detector configured to detect the voltage value applied to the lighting device array at a post-lighting timing at which a predetermined change time longer than a time required for the voltage value controller to change the voltage value has elapsed from a lighting timing at which any one of the switch elements is brought into the opened state;

a second voltage value detector configured to detect the voltage value applied to the lighting device array at a pre-lighting timing set to a predetermined margin time before the lighting timing; and a disconnection determiner configured to determine whether the amount of change in the voltage value detected at the pre-lighting timing and the post-lighting timing matches the amount of change caused by incrementing the lighting device to be turned on by one, and to determine that a disconnection has occurred in any of the bypass circuits if not match, wherein when there is the switch element to be brought into the closed state during a prohibition period from a timing that is prior to the pre-lighting timing by the change time to the post-lighting timing, the lighting schedule generator changes a timing at which the switch element is brought into the closed state outside the prohibition period.

4. The vehicle front lighting apparatus according to claim 1, wherein when there is the switch element to be brought into the closed state during the prohibition period, the lighting schedule generator changes the timing at which the switch element is brought into the closed state outside the prohibition period without changing a timing at which the switch element is brought into the opened state.

5. The vehicle front lighting apparatus according to claim 1, wherein when there is the switch element to be brought into the closed state during the prohibition period, the lighting schedule generator changes the timing at which the switch element is brought into the closed state outside the prohibition period by changing a timing at which the switch element is brought into the opened state.

6. A disconnection detection method adopted in a vehicle front lighting apparatus that illuminates a region in front of a vehicle by use of a lighting device array in which a plurality of lighting devices are connected in series, for detecting whether a disconnection has occurred in a wiring for driving the lighting devices, the vehicle front lighting apparatus including:
a plurality of bypass circuits respectively provided for the lighting devices and allowing a current flowing through the lighting devices to bypass the lighting devices;
a plurality of switch elements respectively provided for the bypass circuits for opening and closing the bypass circuits; and
a lighting controller configured to control a lighting mode of the lighting device array by bringing the switch element of the lighting device to be turned on into an opened state and bringing the switch element of the lighting device to be turned off into a closed state, the disconnection detection method comprising:
acquiring information on a lighting intensity of each of the lighting devices of the lighting device array;
generating, upon acquiring the information on the lighting intensity, a lighting schedule for turning on the lighting devices at timings different from each other, and turning off the lighting devices at timings respectively corresponding to the respective lighting intensities of the lighting devices;
applying a voltage to the lighting device array, detecting a current value flowing through the lighting device array, and changing a voltage value applied to the lighting device array to cause the current value flowing through the lighting device array to reach a predetermined target current value;
detecting the number of switch elements brought into the closed state and the voltage value applied to the lighting device array at a post-lighting timing at which a predetermined change time longer than a time required to change the voltage value applied to the lighting device array has elapsed from a lighting timing at which any of the switch elements is brought into the opened state; and
determining whether the number of switch elements detected at the post-lighting timing matches the voltage value, and determining that the disconnection has occurred in any of the plurality of bypass circuits if not match, wherein
the generating the lighting schedule includes changing a timing at which the switch element is brought into the closed state outside a prohibition period when there is the switch element to be brought into the closed state during the prohibition period from the lighting timing to the post-lighting timing.

7. A disconnection detection method adopted in a vehicle front lighting apparatus that illuminates a region in front of a vehicle by use of a lighting device array in which a plurality of lighting devices are connected in series, for detecting whether a disconnection has occurred in a wiring for driving the lighting devices, the vehicle front lighting apparatus including:
a plurality of bypass circuits respectively provided for the lighting devices and allowing a current flowing through the lighting devices to bypass the lighting devices;
a plurality of switch elements respectively provided for the bypass circuits for opening and closing the bypass circuits; and
a lighting controller configured to control a lighting mode of the lighting device array by bringing the switch element of the lighting device to be turned on into an opened state and bringing the switch element of the lighting device to be turned off into a closed state, the disconnection detection method comprising:
acquiring information on a lighting intensity of each of the lighting devices of the lighting device array;
generating, upon acquiring the information on the lighting intensity, a lighting schedule for turning on the lighting devices at timings different from each other, and turning off the lighting devices at timings respectively corresponding to the lighting intensities of the lighting devices;
applying a voltage to the lighting device array, detecting a current value flowing through the lighting device array, and changing a voltage value applied to the lighting device array to cause the current value flowing through the lighting device array to reach a predetermined target current value;
detecting the number of switch elements brought into the closed state and the voltage value applied to the lighting device array at a post-lighting timing at which a predetermined change time longer than a time required to change the voltage value applied to the lighting device array has elapsed from a lighting timing at which any of the switch elements is brought into the opened state;
upon detection of the number of switch elements and the voltage value at the post-lighting timing, acquiring the amounts of change from the number of switch elements and the voltage value detected at a previous post-lighting timing; and
determining whether the amount of change in the number of switch elements matches the amount of change in the voltage value, and determining that the disconnection has occurred in any of the bypass circuits if not match, wherein
the generating the lighting schedule includes changing a timing at which the switch element is brought into the closed state outside a prohibition period when there is the switch element to be brought into the closed state during the prohibition period from the lighting timing to the post-lighting timing.

8. A disconnection detection method adopted in a vehicle front lighting apparatus that illuminates a region in front of a vehicle by use of a lighting device array in which a plurality of lighting devices are connected in series, for detecting whether a disconnection has occurred in a wiring for driving the lighting devices, the vehicle front lighting apparatus including:
a plurality of bypass circuits respectively provided for the lighting devices and allowing a current flowing through the lighting devices to bypass the lighting devices;
a plurality of switch elements respectively provided for the bypass circuits for opening and closing the bypass circuits; and
a lighting controller configured to control a lighting mode of the lighting device array by bringing the switch element of the lighting device to be turned on into an opened state and bringing the switch element of the lighting device to be turned off into a closed state, the disconnection detection method comprising:
acquiring information on a lighting intensity of each of the lighting devices of the lighting device array;
generating, upon acquiring the information on the lighting intensity, a lighting schedule for turning on the lighting devices at timings different from each other, and turning off the lighting devices at timings respectively corresponding to the lighting intensities of the lighting devices;

applying a voltage to the lighting device array, detecting a current value flowing through the lighting device array, and changing a voltage value applied to the lighting device array to cause the current value flowing through the lighting device array to reach a predetermined target current value;

detecting the voltage value applied to the lighting device array at a pre-lighting timing set to a predetermined margin time before a lighting timing at which any of the switch elements is brought into the opened state;

detecting the voltage value applied to the lighting device array at a post-lighting timing at which a predetermined change time longer than a time required to change the voltage value applied to the lighting device array has elapsed from the lighting timing; and determining whether the amount of change in the voltage value detected at the pre-lighting timing and the post-lighting timing matches the amount of change caused by incrementing the lighting device by one, and determining that the disconnection has occurred in any of the bypass circuits if not match, wherein the generating the lighting schedule includes changing a timing at which the switch element is brought into the closed state outside a prohibition period when there is the switch element to be brought into the closed state during the prohibition period from a timing that is prior to the pre-lighting timing by the change time to the post-lighting timing.

9. The vehicle front lighting apparatus according to claim 2, wherein
when there is the switch element to be brought into the closed state during the prohibition period, the lighting schedule generator changes the timing at which the switch element is brought into the closed state outside the prohibition period without changing a timing at which the switch element is brought into the opened state.

10. The vehicle front lighting apparatus according to claim 2, wherein
when there is the switch element to be brought into the closed state during the prohibition period, the lighting schedule generator changes the timing at which the switch element is brought into the closed state outside the prohibition period by changing a timing at which the switch element is brought into the opened state.

11. The vehicle front lighting apparatus according to claim 3, wherein
when there is the switch element to be brought into the closed state during the prohibition period, the lighting schedule generator changes the timing at which the switch element is brought into the closed state outside the prohibition period without changing a timing at which the switch element is brought into the opened state.

12. The vehicle front lighting apparatus according to claim 3, wherein
when there is the switch element to be brought into the closed state during the prohibition period, the lighting schedule generator changes the timing at which the switch element is brought into the closed state outside the prohibition period by changing a timing at which the switch element is brought into the opened state.

\* \* \* \* \*